(12) United States Patent
Tu et al.

(10) Patent No.: US 10,605,619 B2
(45) Date of Patent: Mar. 31, 2020

(54) PRECISION CALIBRATION METHOD OF ATTITUDE MEASURING SYSTEM

(71) Applicant: SHANGHAI HUACE NAVIGATION TECHNOLOGY LTD, Shanghai (CN)

(72) Inventors: Rui Tu, Shanghai (CN); Xuefeng Shen, Shanghai (CN); Wenlong Zhao, Shanghai (CN); Wending Dai, Shanghai (CN); Qiang Yue, Shanghai (CN)

(73) Assignee: SHANGHAI HUACE NAVIGATION TECHNOLOGY LTD, Shanghai (CN)

( * ) Notice: Subject to any disclaimer, the term of this patent is extended or adjusted under 35 U.S.C. 154(b) by 366 days.

(21) Appl. No.: 15/542,931

(22) PCT Filed: Jul. 4, 2016

(86) PCT No.: PCT/CN2016/088303
§ 371 (c)(1),
(2) Date: Jul. 12, 2017

(87) PCT Pub. No.: WO2017/063386
PCT Pub. Date: Apr. 20, 2017

(65) Prior Publication Data
US 2018/0010923 A1 Jan. 11, 2018

(30) Foreign Application Priority Data

Oct. 13, 2015 (CN) .......................... 2015 1 0665021

(51) Int. Cl.
*G01C 25/00* (2006.01)
*G01C 17/38* (2006.01)
(Continued)

(52) U.S. Cl.
CPC ............. *G01C 25/00* (2013.01); *G01C 17/38* (2013.01); *G01C 25/005* (2013.01); *G01P 21/00* (2013.01); *G01P 15/18* (2013.01)

(58) Field of Classification Search
CPC ...... G01C 25/00; G01C 25/005; G01C 17/00; G01C 17/38; G01C 21/00; G01P 21/00; G01P 15/18
(Continued)

(56) References Cited

U.S. PATENT DOCUMENTS

2012/0203487 A1   8/2012   Johnson et al.

FOREIGN PATENT DOCUMENTS

| CN | 102252689 A | 11/2011 |
| CN | 103776451 A | 5/2014 |
| CN | 105352487 A | 2/2016 |

OTHER PUBLICATIONS

Zhang, Wei et el., "Automatic Error Compensation Method of Three-Axis Electronic Compass Based on the Fluxgate", Chinese Journal of Sensors and Actuators, vol. 25, No. 12, Dec. 31, 2012 (3 1.1 2.2012), ISSN: 1004-1699, p. 1692, last paragraph, p. 1693, section "2 Calibration Method", paragraphs 1-2, p. 1694, paragraph 2 and p. 1694, section "3 Experimental verification".

(Continued)

*Primary Examiner* — Robert R Raevis
(74) *Attorney, Agent, or Firm* — Bayramoglu Law Offices LLC

(57) ABSTRACT

A precision calibration method of attitude measuring systems is provided. The precision calibration method of attitude measuring systems includes the following steps: calibrating a zero-deviation, a scale coefficient, and a non-orthogonal angle between axes of an accelerometer to the attitude measuring system via an ellipsoid fitting model (S1); compensating original data of the accelerometer using (Continued)

a calculated ellipsoid parameter (S2); calibrating an electronic compass via the ellipsoid fitting model according to compensated accelerometer data (S3); compensating original electronic compass data by the calculated ellipsoid parameter (S4); calculating an attitude according to the compensated data of the accelerometer and compensated data of the electronic compass (S5). The above steps of the method have a reliable calibration result and a high precision with a less time consumption of calibration.

9 Claims, 7 Drawing Sheets

(51) Int. Cl.
    *G01P 21/00*     (2006.01)
    *G01P 15/18*     (2013.01)

(58) Field of Classification Search
    USPC ..... 73/1.78; 701/4–10, 38; 702/85, 150–154
    See application file for complete search history.

(56) References Cited

OTHER PUBLICATIONS

Liu, Yanxia et al., "Three-Axis Accelerometer Error Calibration and Compensation based on Ellisoid Hypothesis", Transducer and Microsystem Technologies, vol. 33, No. 6, Dec. 31, 2014 (3 1.1 2.2014), ISSN: 2096-2436, abstract.

Zhao, Daidi, Research on Anti-interference Attitude Algorithm of MARG Measurement System, China Master's Theses Full-Text Database, Vol. of Information Technology, Jul. 15, 2015, vol. 7 2015.

Feng, Wenguang, et al. Error Calibration of Three-Axis Magnetic Heading Sensor, Journal of Applied Sciences-Electronics and Information Engineering, vol. 31 No. 2, Mar. 31, 2013, pp. 154-158.

Xizhong Lou et al. Realization of Ellipsoid Fitting Calibration for Three-Axis Magnetic Sensor Based on STM32 Embedded System, Serious Games, Jan. 1, 2015, Springer International Publishing, Cham 032682, XP055584666, ISSN:0302-9743; ISBN:978-3-642-38979-5, vol. 8944, pp. 717-726, DOI:10.1007/978-3-319-15554-8_61.

PRECISION CALIBRATION METHOD OF ATTITUDE MEASURING SYSTEM

CROSS REFERENCE TO RELATED APPLICATIONS

This application is the national phase entry of International Application No. PCT/CN2016/088303, filed on Jul. 4, 2016, which is based upon and claims priority to Chinese Patent Application No. 201510665021.X filed on Oct. 13, 2015, the entire contents of which are incorporated herein by reference.

TECHNICAL FIELD

The present invention relates to the field of measuring device attitude, particularly to a precision calibration method of attitude measuring systems.

BACKGROUND

The attitude measuring systems have a wide variety of applications in many industrial fields. The measuring systems are a set of apparatuses for measuring spatial attitudes of an object (i.e. pitch angle, transverse roll angle, and course angle). In recent years, with the ever-decreasing cost of hardware, various types of attitude measuring systems have begun to enter the daily life of huge numbers of families. Taking mobile phones as an example, most smart phones currently on the market have built-in accelerometers, gyroscopes, and electronic compasses, which constitute a simple and low-cost attitude measuring system. However, currently, due to cost limitations, the built-in sensors of most attitude measuring systems have low accuracy and stability, thereby causing non-ideal measuring results of the entire attitude measuring system. Undoubtedly, calibrating the sensor without changing the hardware of the system is a very practical manner to improve the measurement accuracy of the whole system. Thus, studying the low-cost calibration method of attitude measuring systems is very worthwhile in practice.

The calibration and standardization of a sensor is always an important subject in the technical field of sensor technology. A large number of relevant researches have been carried out by domestic and foreign scholars with respect to the calibration solution of attitude measuring systems. A multi-position calibration method of MEMS inertial navigation using a rate turntable was studied by Wei Sun, Xinru Fu, et. al. An electronic compass calibration solution based on the Fourier transform under the condition of angle reference was studied by the scholars Binliang Ma, et al. An on-line calibration technology for the attitude measuring system based on the neural network and the UKF (Unscented Kalman Filtering) was studied by the scholars Wei Qin, et al.

Currently, studies are mainly focused on calibrating the attitude measuring system using calibration instruments such as turntable and the like. However, the specialized instruments for calibration are expensive and most of them are complicated to operate, thereby resulting in high production cost. On the other hand, in practice, the performance of the sensor in the system is continuously changing as the surrounding environment changes and the sensor itself ages. Thus, in practice, high precision is hard to achieve if merely relying on the calibration that was done on the sensor when the sensor left the factory. Additionally, in some current studies of calibration without instruments, either the calibration solution is too simple to be beneficial for the improvement of the actual measurement accuracy, or that the calibration solution is too complicated and requires the user to have high technical skills.

SUMMARY OF THE INVENTION

With regard to the drawbacks of the current attitude calibration, the present invention provides a precision calibration method of attitude measuring systems, which has a reliable calibration result, high accuracy, and less time consumption.

To achieve the above object, the technical solutions adopted by the present invention are as below.

A precision calibration method of attitude measuring systems is provided. The precision calibration method of attitude measuring system includes the following steps:

calibrating a zero-deviation, a scale coefficient, and a non-orthogonal angle between axes of an accelerometer to the attitude measuring system via an ellipsoid fitting model;

compensating original data of the accelerometer using a calculated ellipsoid parameter;

calibrating an electronic compass via the ellipsoid fitting model according to compensated accelerometer data;

compensating original electronic compass data by the calculated ellipsoid parameter;

calculating an attitude according to the compensated data of the accelerometer and compensated data of the electronic compass.

According to one aspect of the present invention, before the step of calibrating the zero-deviation, the scale coefficient, and the non-orthogonal angle between axes of the accelerometer of the attitude measuring system via the ellipsoid fitting model is conducted, the following step is conducted: conducting a horizontal calibration on the accelerometer to eliminate an original zero-deviation of the accelerometer.

According to one aspect of the present invention, after the step of conducting the horizontal calibration on the accelerometer to eliminate the original zero-deviation of the accelerometer is conducted, the following step is conducted: collecting three-axis data of the accelerometer in a period of time, wherein the three-axis data is recorded as $[A_{x0}, A_{y0}, A_{z0}]^T$, and the zero-deviation is recorded as $B=[A_{x0}, A_{y0}, A_{z0}]^T-[0\ 0\ g]^T$.

According to one aspect of the present invention, the step of calibrating the zero-deviation, the scale coefficient, and the non-orthogonal angle between axes of the accelerometer of the attitude measuring system via the ellipsoid fitting model further includes the following steps:

setting a fitting ellipsoid parameter vector recorded as $\alpha=[a\ b\ c\ d\ e\ f\ k\ l\ m\ n]^T$;

setting a calibration iteration number as n, expanding a first value $[A_{x0}, A_{y0}, A_{z0}]^T$ collected from the accelerometer to a ten-dimensional column vector D1, and calculating a matrix S1, wherein the D1 is recorded as $D1=[A_{x1}^2\ A_{y1}^2\ A_{z1}^2\ A_{x1}A_{y1}\ A_{x1}A_{z1}\ A_{y1}A_{z1}\ A_{x1}\ A_{y1}\ A_{z1}\ 1]^T$, $S1=D1^T D1$;

if times of collection of the three-axis data of the accelerometer do not reach n, updating a matrix S using newly collected accelerometer data $D_k$, wherein $S_k=S_{k-1}+D_k^T D_k$;

after the matrix S is calculated, introducing an ellipsoid restriction matrix C and splitting the matrix S into blocks at the same time, wherein $$C = \begin{bmatrix} C_1 & C_2 \\ C_3 & C_4 \end{bmatrix}, C_1 = \begin{bmatrix} 0 & 0 & 2 \\ 0 & -1 & 0 \\ 2 & 0 & 0 \end{bmatrix}$$

$$C_2 = 0_{3\times 7}, C_3 = 0_{7\times 3}, C_4 = 0_{7\times 7}$$

splitting the matrix S into blocks:

$$D_k = [\, D_1 \quad D_2 \,]$$

$$D_1 = [\, A_{x1}^2 \quad A_{y1}^2 \quad A_{z1}^2 \,]$$

$$D_2 = [\, A_{x1}A_{y1} \quad A_{y1}A_{z1} \quad A_{x1}A_{z1} \quad A_{x1} \quad A_{y1} \quad A_{z1} \quad 1 \,]$$

$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1 - S_2 S_4^{-1} S_2^T)\alpha_1 = \lambda \alpha_1$$

$$\alpha_2 = -S_4^{-1} S_2^T \alpha_1;$$

after $\alpha_1$ is calculated, calculating $\alpha_2$ by the above equations, such that each parameter of the ellipsoid fitting vector is calculated, wherein $\alpha = [\alpha_1 \; \alpha_2] = [a\; b\; c\; d\; e\; f\; k\; l\; m\; n]^T$;

furthermore, with reference to an actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T A B - n)}\right).$$

According to one aspect of the present invention, after the step of calibrating the zero-deviation, the scale coefficient, and the non-orthogonal angle between axes of the accelerometer of the attitude measuring system via the ellipsoid fitting model is conducted, the following step is conducted: after new accelerometer data is collected, correcting newly collected data using the ellipsoid parameter.

According to one aspect of the present invention, the step of calibrating the electronic compass via the ellipsoid fitting model according to the compensated accelerometer data further includes the following steps:

setting the fitting ellipsoid parameter vector recorded as $\alpha = [a\; b\; c\; d\; e\; f\; k\; l\; m\; n]^T$;

collecting the three-axis data of the electronic compass in a period of time, and conducting an anti-overflow treatment operation on collected data, wherein the three-axis data is recorded as $[H_{x0}\; H_{y0}\; H_{z0}]^T$;

setting the calibration iteration number as n, expanding a first value $[H_{x1}, H_{y1}, H_{z1}]^T$ collected from the electronic compass to a ten-dimensional column vector D1, and calculating a matrix S1, wherein the D1 is recorded as $D1 = [H_{x1}^2\; H_{y1}^2\; H_{z1}^2\; H_{x1}H_{y1}\; H_{x1}H_{z1}\; H_{y1}H_{z1}\; H_{x1}\; H_{y1}\; H_{z1}\; 1]^T$, wherein $S1 = D1^T D1$;

if times of collection of the three-axis data of the electronic compass do not reach n, updating the matrix S using the newly collected compass data $D_k$, wherein $S_k = S_{k-1} + D_k^T D_k$;

after the matrix S is calculated, introducing the ellipsoid restriction matrix C and splitting the matrix S into blocks at the same time, wherein $$C = \begin{bmatrix} C_1 & C_2 \\ C_3 & C_4 \end{bmatrix}, C_1 = \begin{bmatrix} 0 & 0 & 2 \\ 0 & -1 & 0 \\ 2 & 0 & 0 \end{bmatrix}$$

$$C_2 = 0_{3\times 7}, C_3 = 0_{7\times 3}, C_4 = 0_{7\times 7}$$

splitting the matrix S into blocks:

$$D_k = [\, D_1 \quad D_2 \,]$$

$$D_1 = [\, A_{x1}^2 \quad A_{y1}^2 \quad A_{z1}^2 \,]$$

$$D_2 = [\, A_{x1}A_{y1} \quad A_{y1}A_{z1} \quad A_{x1}A_{z1} \quad A_{x1} \quad A_{y1} \quad A_{z1} \quad 1 \,]$$

$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1 - S_2 S_4^{-1} S_2^T)\alpha_1 = \lambda \alpha_1$$

$$\alpha_2 = -S_4^{-1} S_2^T \alpha_1;$$

after $\alpha_1$ is calculated, calculating $\alpha_2$ by the above equations, such that each parameter of the ellipsoid fitting vector is calculated, wherein $\alpha = [\alpha_1 \; \alpha_2] = [a\; b\; c\; d\; e\; f\; k\; l\; m\; n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T A B - n)}\right).$$

According to one aspect of the present invention, after the step of calibrating the electronic compass according to the compensated accelerometer data via the ellipsoid fitting model, the following step is conducted: after new electronic compass data is collected, correcting the newly collected data using the ellipsoid parameter.

According to one aspect of the present invention, after conducting the step of calculating the attitude according to the compensated accelerometer data and the compensated electronic compass data, the following step is conducted: updating the ellipsoid parameter by the electronic compass using measured data during a measuring process, so as to enhance a precision of the ellipsoid parameter.

According to one aspect of the present invention, before the step of updating the ellipsoid parameter by the electronic compass using the measured data during the measuring process so as to enhance the precision of the ellipsoid parameter is conducted, the following step is conducted: removing a hopped calculation point from the collected electronic compass data by means of a statistical rule.

The advantages of the present invention are as below. The method of ellipsoid fitting is used to calibrate the electronic compass and the acceleration in the attitude measuring system. Thus, the problems of accidental output abnormality of the sensor and hops are effectively avoided, since the reliability of calibration result is effectively ensured. The recursive processing is conducted in the ellipsoid fitting algorithm such that the internal CPU of the attitude measuring system does not need to store the data of all points previously collected by the sensor during the data processing. Only the matrix previously obtained by recurrence and the current measurement result are required to be stored. Therefore, under the same hardware environment, the ellipsoid fitting method can handle more values, thereby improving the precision of the ellipsoid fitting. Correspondingly, when the conventional fitting algorithm is used, in order to ensure that the memory stack does not overflow during the operation process, the CPU can only conduct the fitting operation based on a few sample points. As a result, the fitting precision is limited. The present invention improved a large-scale of matrix operation in the ellipsoid fitting algorithm and optimized the calculation procedure, such that the calculation of the ellipsoid fitting is reduced by over 90 percent. Taking the MATLAB program as an example, based on the conventional algorithm, operating the fitting algorithm one time would consume 563 ms. In contrast, the improved algorithm only consumes 14 ms. The strategy in which the measured data is used for calibrating is employed, such that the fault-tolerant capability of the calibration is improved. Thus, the requirement of initial calibration is reduced, and the operation complexity for the user is simplified.

BRIEF DESCRIPTION OF THE DRAWINGS

In order to clearly illustrate the technical solutions of the embodiments of the present invention, the drawings used in the embodiments are briefly introduced as follows. Obviously, the drawings described below are only some embodiments of the present invention. For a person of ordinary skill in the art, other drawings can also be derived without making creative efforts.

DETAILED DESCRIPTION OF THE INVENTION

Hereinafter, technical solutions of embodiments of the present invention are clearly and completely described with reference to drawings of embodiments of the present invention. Obviously, the described embodiments are only some of the embodiments of the present invention rather than all of them. Based on the embodiments of the present invention, all other embodiments derived by a person of ordinary skill in the art without making creative efforts fall within the protective scope of the present invention.

Embodiment 1

Figure 1:
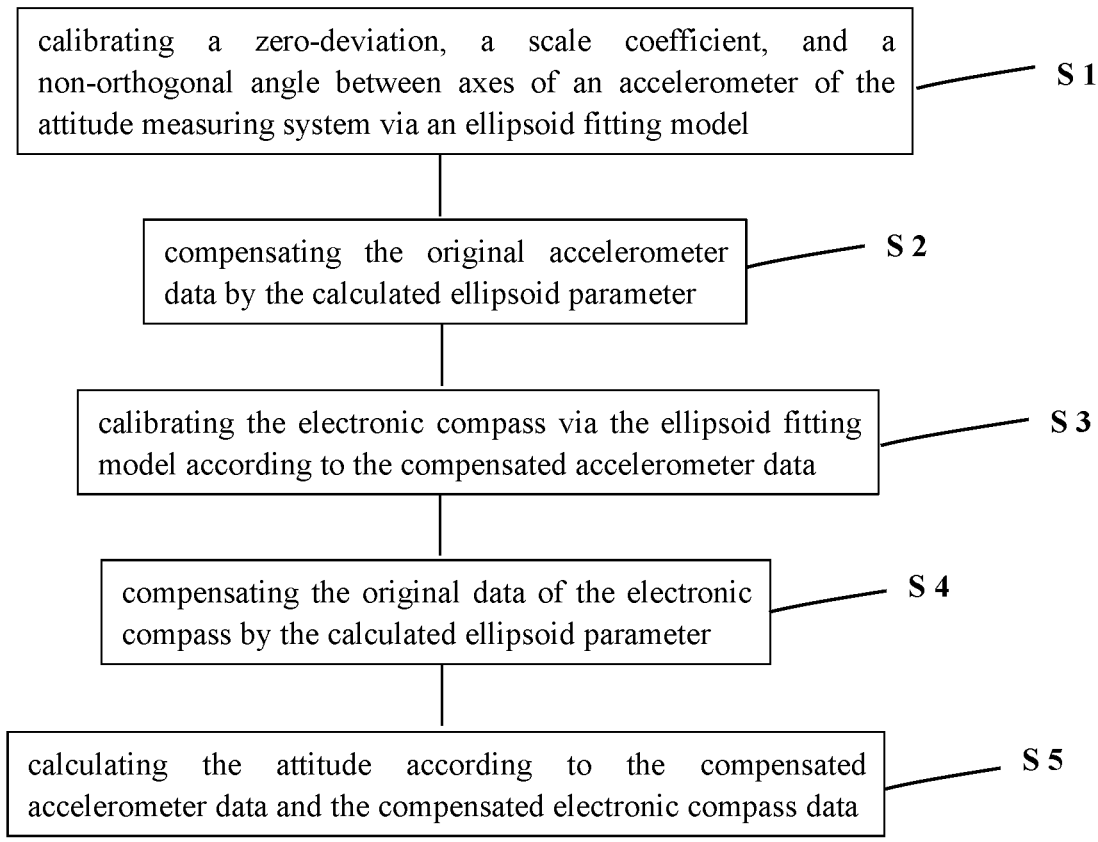
FIG. 1 is a flow chart of embodiment 1 of the precision calibration method of attitude measuring system of the present invention.

As shown in FIG. 1, a precision calibration method of attitude measuring system is provided. The precision calibration method of attitude measuring system includes the following steps:

Step S1: calibrating a zero-deviation, a scale coefficient, and a non-orthogonal angle between axes of an accelerometer of the attitude measuring system via an ellipsoid fitting model;

In the Step S1: calibrating a zero-deviation, a scale coefficient, and a non-orthogonal angle between axes of an accelerometer of the attitude measuring system via an ellipsoid fitting model further comprises the following steps:

setting a fitting ellipsoid parameter vector recorded as $\alpha=[a\ b\ c\ d\ e\ f\ k\ l\ m\ n]^T$;

setting a calibration iteration number as n, expanding a first value $[A_{x0}, A_{y0}, A_{z0}]^T$ collected from the accelerometer to a ten-dimensional column vector D1, and calculating a matrix S1, wherein the D1 is recorded as $D1=[A_{x1}^2\ A_{y1}^2\ A_{z1}^2\ A_{x1}A_{y1}\ A_{x1}A_{z1}\ A_{y1}A_{z1}\ A_{x1}\ A_{y1}\ A_{z1}\ 1]^T$, $S1=D1^TD1$;

if times of collection of the three-axis data of the accelerometer do not reach n, updating a matrix S using the newly collected accelerometer data $D_k$, wherein $$S_k = S_{k-1} + D_k^T D_k;$$

after the matrix S is calculated, introducing an ellipsoid restriction matrix C and splitting the matrix S into blocks at the same time, wherein $$C = \begin{bmatrix} C_1 & C_2 \\ C_3 & C_4 \end{bmatrix}, C_1 = \begin{bmatrix} 0 & 0 & 2 \\ 0 & -1 & 0 \\ 2 & 0 & 0 \end{bmatrix}$$

$$C_2 = 0_{3\times7},\ C_3 = 0_{7\times3},\ C_4 = 0_{7\times7}$$

splitting the matrix S into blocks:

$$D_k = [\ D_1\ \ D_2\ ]$$
$$D_1 = [\ A_{x1}^2\ \ A_{y1}^2\ \ A_{z1}^2\ ]$$

-continued $$D_2 = [\, A_{x1}A_{y1} \quad A_{y1}A_{z1} \quad A_{x1}A_{z1} \quad A_{x1} \quad A_{y1} \quad A_{z1} \quad 1\,]$$

$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1 - S_2 S_4^{-1} S_2^T)\alpha_1 = \lambda \alpha_1$$

$$\alpha_2 = -S_4^{-1} S_2^T \alpha_1$$

after $\alpha_1$ is calculated, calculating $\alpha_2$ by the above equations, such that each parameter of the ellipsoid fitting vector is calculated, wherein $\alpha = [\alpha_1\ \alpha_2] = [a\ b\ c\ d\ e\ f\ k\ l\ m\ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T A B - n)}\right).$$

In the above equations, $\alpha_1$ is an eigenvector corresponding to the maximum eigenvalue of the matrix $C_1^{-1}(S_1 - S_2 S_4^{-1} S_2^T)$. Thus, in the practical calculation, not all eigenvalues and eigenvectors need to be calculated. Even the eigenvalues do not need to be calculated. Only a power-method or an inverse power-method is needed to calculate the maximum eigenvector. The inverse power-method is taken as an example:

Providing that $A = (C_1^{-1}(S_1 - S_2 S_4^{-1} S_2^T))^{-1}$, an initial iteration vector $u = [1\ 1\ 1]^T$ is taken, and an iteration precision $\varepsilon = 1e^{-6}$ is set;

conducting LU decomposition on A, namely, $A = LU$;
solving the linear equations set:

$$Ly^{(k)} = u^{(k-1)},\ Uv^{(k)} = y^{(k)}$$

$$m_k = \max(v^{(k)}),\ u^{(k)} = v^{(k)}/m_k$$

if $|m_k - m_{k-1}| < \varepsilon$, jumping out of the iteration to stop the calculation, wherein $\alpha_1 = u^{(k)}$; otherwise, $k = k+1$, and continuing the calculation.

Generally speaking, with regard to $\varepsilon = 1e^{-6}$, less than 5 iterations of the iterative calculation can achieve this precision.

Step S2: compensating the original accelerometer data by the calculated ellipsoid parameter.

Step S3: calibrating the electronic compass via the ellipsoid fitting model according to the compensated accelerometer data;

In the Step S3: calibrating the electronic compass via the ellipsoid fitting model according to the compensated accelerometer data further comprises the following steps:

setting the fitting ellipsoid parameter vector recorded as $\alpha = [a\ b\ c\ d\ e\ f\ k\ l\ m\ n]^T$;

collecting the three-axis data of the electronic compass in a period of time, and conducting an operation anti-overflow treatment on collected data, wherein the three-axis data is recorded as $[H_{x0}\ H_{y0}\ H_{z0}]^T$;

setting the calibration iteration number as n, expanding a first value $[H_{x1}, H_{y1}, H_{z1}]^T$ collected from the electronic compass to a ten-dimensional column vector D1, calculating a matrix S1, wherein the D1 is recorded as $D1 = [H_{x1}^2\ H_{y1}^2\ H_{z1}^2\ H_{x1}H_{y1}\ H_{x1}H_{z1}\ H_{y1}H_{z1}\ H_{x1}\ H_{y1}\ H_{z1}\ 1]^T$, $S1 = D1^T D1$;

if times of collection of the three-axis data of the electronic compass do not reach n, updating the matrix S using the newly collected compass data $D_k$, wherein $S_k = S_{k-1} + D_k^T D_k$;

after the matrix S is calculated, introducing the ellipsoid restriction matrix C and splitting the matrix S into blocks at the same time, wherein $$C = \begin{bmatrix} C_1 & C_2 \\ C_3 & C_4 \end{bmatrix},\ C_1 = \begin{bmatrix} 0 & 0 & 2 \\ 0 & -1 & 0 \\ 2 & 0 & 0 \end{bmatrix}$$

$$C_2 = 0_{3\times 7},\ C_3 = 0_{7\times 3},\ C_4 = 0_{7\times 7}$$

splitting the matrix S into blocks:

$$D_k = [\,D_1 \quad D_2\,]$$

$$D_1 = [\,A_{x1}^2 \quad A_{y1}^2 \quad A_{z1}^2\,]$$

$$D_2 = [\,A_{x1}A_{y1} \quad A_{y1}A_{z1} \quad A_{x1}A_{z1} \quad A_{x1} \quad A_{y1} \quad A_{z1} \quad 1\,]$$

$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1 - S_2 S_4^{-1} S_2^T)\alpha_1 = \lambda \alpha_1$$

$$\alpha_2 = -S_4^{-1} S_2^T \alpha_1;$$

after $\alpha_1$ is calculated, calculating $\alpha_2$ by the above equations, such that each parameter of the ellipsoid fitting vector is calculated, wherein $\alpha = [\alpha_1\ \alpha_2] = [a\ b\ c\ d\ e\ f\ k\ l\ m\ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T A B - n)}\right).$$

In the above equations, $\alpha_1$ is an eigenvector corresponding to the maximum eigenvalue of the matrix $C_1^{-1}(S_1-S_2S_4^{-1}S_2^T)$. Thus, in the practical calculating, not all eigenvalues and eigenvectors need to be calculated. Even the eigenvalues do not need to be calculated. Only a power-method or an inverse power-method is needed to calculate the maximum eigenvector. The inverse power-method is taken as an example:

Providing that $A=(C_1^{-1}(S_1-S_2S_4^{-1}S_2^T))^{-1}$, an initial iteration vector $u=[1\ 1\ 1]^T$ is taken, and an iteration precision $\varepsilon=1e^{-6}$ is set;

conducting LU decomposition on A, namely, A=LU;
solving the linear equations set:

$$Ly^{(k)}=u^{(k-1)},\ Uv^{(k)}=y^{(k)}$$

$$m_k=\max(v^{(k)}),\ u^{(k)}=v^{(k)}/m_k$$

if $|m_k-m_{k-1}|<\varepsilon$, jumping out of the iteration to stop the calculation, wherein $\alpha_1=u^{(k)}$; otherwise, k=k+1, and continuing the calculation.

Generally speaking, with regard to $\varepsilon=1e^{-6}$, less than 5 iterations of the iterative calculation can achieve this precision.

Step S4: compensating the original data of the electronic compass by the calculated ellipsoid parameter.

Step S5: calculating the attitude according to the compensated accelerometer data and the compensated electronic compass data.

Embodiment 2

Figure 2:
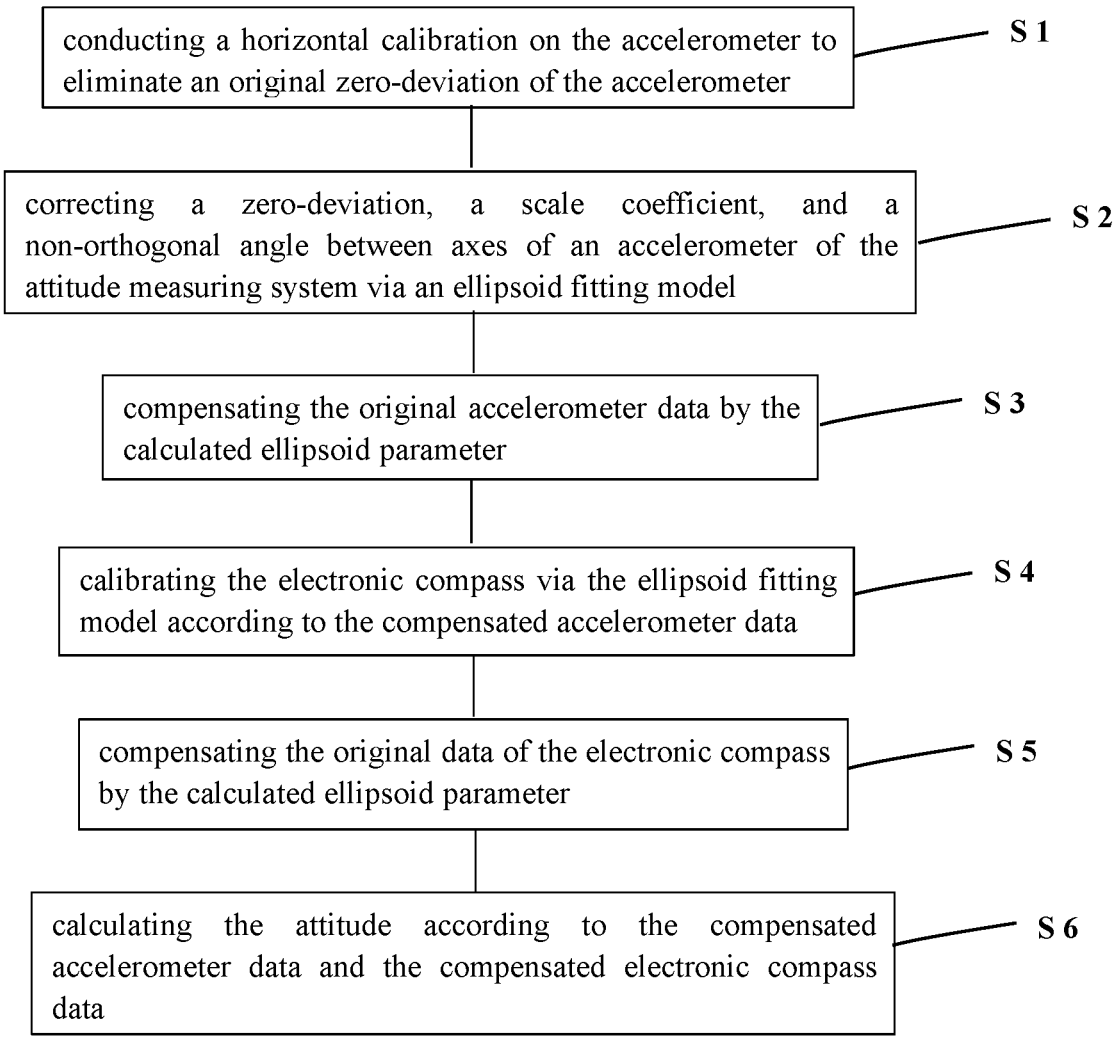
FIG. 2 is a flow chart of embodiment 2 of the precision calibration method of attitude measuring system of the present invention.

As shown in FIG. 2, a precision calibration method of attitude measuring system is provided. The precision calibration method of attitude measuring system includes the following steps:

Step S1: conducting a horizontal calibration on the accelerometer to eliminate an original zero-deviation of the accelerometer;

adjusting the attitude measurement apparatus to a horizontal position by a level bubble, and conducting a horizontal calibration on the accelerometer to eliminate the zero-deviation of the accelerometer.

Step S2: calibrating a zero-deviation, a scale coefficient, and a non-orthogonal angle between axes of an accelerometer of the attitude measuring system via an ellipsoid fitting model;

In the step S2: calibrating a zero-deviation, a scale coefficient, and a non-orthogonal angle between axes of an accelerometer of the attitude measuring system via an ellipsoid fitting model further includes the following steps:

setting a fitting ellipsoid parameter vector recorded as $\alpha=[a\ b\ c\ d\ e\ f\ k\ l\ m\ n]^T$;

setting a calibration iteration number as n, expanding a first value $[A_{x0}, A_{y0}, A_{z0}]^T$ collected from the accelerometer to a ten-dimensional column vector D1, and calculating a matrix S1, wherein the D1 is recorded as $D1=[A_{x1}^2\ A_{y1}^2\ A_{z1}^2\ A_{x1}A_{y1}\ A_{x1}A_{z1}\ A_{y1}A_{z1}\ A_{x1}\ A_{y1}\ A_{z1}\ 1]^T$, $S1=D1^TD1$;

if times of collection of the three-axis data of the accelerometer does not reach n yet, updating a matrix S using the newly collected accelerometer data $D_k$, wherein $S_k=S_{k-1}+D_k^TD_k$;

after the matrix S is calculated, introducing an ellipsoid restriction matrix C and splitting the matrix S into blocks at the same time, wherein $$C=\begin{bmatrix}C_1 & C_2\\C_3 & C_4\end{bmatrix},\ C_1=\begin{bmatrix}0 & 0 & 2\\0 & -1 & 0\\2 & 0 & 0\end{bmatrix}$$

$C_2=0_{3\times 7},\ C_3=0_{7\times 3},\ C_4=0_{7\times 7}$ splitting the matrix S into blocks:

$$D_k=[D_1\ D_2]$$

$$D_1=[A_{x1}^2\ A_{y1}^2\ A_{z1}^2]$$

$$D_2=[A_{x1}A_{y1}\ A_{y1}A_{z1}\ A_{x1}A_{z1}\ A_{x1}\ A_{y1}\ A_{z1}\ 1]$$

$$S=D_k^TD_k=\begin{bmatrix}D_1^TD_1 & D_1^TD_2\\D_2^TD_1 & D_2^TD_2\end{bmatrix}=\begin{bmatrix}S_1 & S_2\\S_3 & S_4\end{bmatrix}$$

calculating the ellipsoid fitting vector by the following equations:

$$C_1^{-1}(S_1-S_2S_4^{-1}S_2^T)\alpha_1=\lambda\alpha_1$$

$$\alpha_2=-S_4^{-1}S_2^T\alpha_1;$$

after $\alpha_1$ is calculated, calculating $\alpha_2$ by the above equations, such that each parameter of the ellipsoid fitting vector is calculated, wherein $\alpha=[\alpha_1\ \alpha_2]=[a\ b\ c\ d\ e\ f\ k\ l\ m\ n]^T$;

furthermore, with reference to the actual physical correspondence, the three-axis scale coefficients $k_x,k_y,k_z$, the non-orthogonal angles between axes $\delta_{xy},\delta_{yz},\delta_{xz}$, and the residual zero-deviations $b_x,b_y,b_z$ can be calculated by the following equations:

$$A=\begin{bmatrix}a & d & e\\d & b & f\\e & f & c\end{bmatrix}$$

$$B=\begin{bmatrix}b_x\\b_y\\b_z\end{bmatrix}=A^{-1}\begin{bmatrix}k\\l\\m\end{bmatrix}$$

$$A_e=\begin{bmatrix}k_x & \delta_{xy} & \delta_{xz}\\0 & k_y & \delta_{yz}\\0 & 0 & k_z\end{bmatrix}=\mathrm{chol}\left(\frac{A}{(B^TAB-n)}\right).$$

In the above equations, $\alpha_1$ is an eigenvector corresponding to the maximum eigenvalue of the matrix $C_1^{-1}(S_1-S_2S_4^{-1}S_2^T)$. Thus, in the practical calculation, not all eigenvalues and eigenvectors need to be calculated. Even the eigenvalues do not need to be calculated. Only a power-method or an inverse power-method is needed to calculate the maximum eigenvector. The inverse power-method is taken as an example:

Providing that $A=(C_1^{-1}(S_1-S_2S_4^{-1}S_2^T))^{-1}$, an initial iteration vector $u=[1\ 1\ 1]^T$ is taken, setting an iteration precision $\varepsilon=1e^{-6}$ is set;

conducting LU decomposition on A, namely, A=LU;
solving the linear equations set:

$$Ly^{(k)}=u^{(k-1)},\ Uv^{(k)}=y^{(k)}$$

$$m_k=\max(v^{(k)}),\ u^{(k)}=v^{(k)}/m_k$$

if $|m_k-m_{k-1}|<\varepsilon$, jumping out of the iteration to stop the calculation, wherein $\alpha_1=u^{(k)}$; otherwise, k=k+1, and continuing the calculation.

Generally speaking, with regard to $\varepsilon=1e^{-6}$, less than 5 iterations of the iterative calculation can achieve this precision.

Step S3: compensating the original accelerometer data by the calculated ellipsoid parameter.

Step S4: calibrating the electronic compass via the ellipsoid fitting model according to the compensated accelerometer data;

In the Step S4: calibrating the electronic compass via the ellipsoid fitting model according to the compensated accelerometer data further comprises the following steps:

setting the fitting ellipsoid parameter vector recorded as $\alpha=[a\ b\ c\ d\ e\ f\ k\ l\ m\ n]^T$;

collecting the three-axis data of the electronic compass in a period of time, and conducting an operation anti-overflow treatment on the collected data, wherein the three-axis data is recorded as $[H_{x0}\ H_{y0}\ H_{z0}]^T$;

setting the calibration iteration number as n, expanding a first value $[H_{x1}, H_{y1}, H_{z1}]^T$ collected from the electronic compass to a ten-dimensional column vector D1, and calculating a matrix S1, wherein the D1 is recorded as $D1=[H_{x1}^2\ H_{y1}^2\ H_{z1}^2\ H_{x1}H_{y1}\ H_{x1}H_{z1}\ H_{y1}H_{z1}\ H_{x1}\ H_{y1}\ H_{z1}\ 1]^T$, $S1=D1^T D1$;

if times of collection of the three-axis data of the electronic compass do not reach n, updating the matrix S using the newly collected compass data $D_k$, wherein $S_k=S_{k-1}+D_k^T D_k$;

after the matrix S is calculated, introducing the ellipsoid restriction matrix C and splitting the matrix S into blocks at the same time, wherein $$C = \begin{bmatrix} C_1 & C_2 \\ C_3 & C_4 \end{bmatrix}, C_1 = \begin{bmatrix} 0 & 0 & 2 \\ 0 & -1 & 0 \\ 2 & 0 & 0 \end{bmatrix}$$

$C_2 = 0_{3\times 7}, C_3 = 0_{7\times 3}, C_4 = 0_{7\times 7}$ splitting the matrix S into blocks:

$D_k = [\ D_1\ \ D_2\ ]$ $D_1 = [\ A_{x1}^2\ \ A_{y1}^2\ \ A_{z1}^2\ ]$ $D_2 = [\ A_{x1}A_{y1}\ \ A_{y1}A_{z1}\ \ A_{x1}A_{z1}\ \ A_{x1}\ \ A_{y1}\ \ A_{z1}\ \ 1\ ]$ $S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$ calculating the ellipsoid fitting vector by the following equations:

$C_1^{-1}(S_1-S_2 S_4^{-1} S_2^T)\alpha_1 = \lambda \alpha_1$ $\alpha_2 = -S_4^{-1} S_2^T \alpha_1$;

after $\alpha_1$ is calculated, calculating $\alpha_2$ by the above equations, such that each parameter of the ellipsoid fitting vector is calculated, wherein $\alpha=[\alpha_1\ \alpha_2]=[a\ b\ c\ d\ e\ f\ k\ l\ m\ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T AB - n)}\right).$$

In the above equations, $\alpha_1$ is an eigenvector corresponding to the maximum eigenvalue of the matrix $C_1^{-1}(S_1-S_2 S_4^{-1} S_2^T)$. Thus, in the practical calculation, not all eigenvalues and eigenvectors need to be calculated. Even the eigenvalues do not need to be calculated. Only a power-method or an inverse power-method is needed to calculate the maximum eigenvector. The inverse power-method is taken as an example:

Providing that $A=(C_1^{-1}(S_1-S_2 S_4^{-1} S_2^T))^{-1}$, an initial iteration vector $u=[1\ 1\ 1]^T$ is taken, and an iteration precision $\varepsilon=1e^{-6}$ is set;

conducting LU decomposition on A, namely, A=LU;
solving the linear equations set:

$Ly^{(k)}=u^{(k-1)}$, $Uv^{(k)}=y^{(k)}$ $m_k=\max(v^{(k)})$, $u^{(k)}=v^{(k)}/m_k$ if $|m_k - m_{k-1}|<\varepsilon$, jumping out of the iteration to stop the calculation, wherein $\alpha_1=u^{(k)}$; otherwise, k=k+1, and continuing the calculation.

Generally speaking, with regard to $\varepsilon=1e^{-6}$, less than 5 iterations of the iterative calculation can achieve this precision.

Step S5: compensating the original data of the electronic compass by the calculated ellipsoid parameter.

Step S6: calculating the attitude according to the compensated accelerometer data and the compensated electronic compass data.

Embodiment 3

Figure 3:
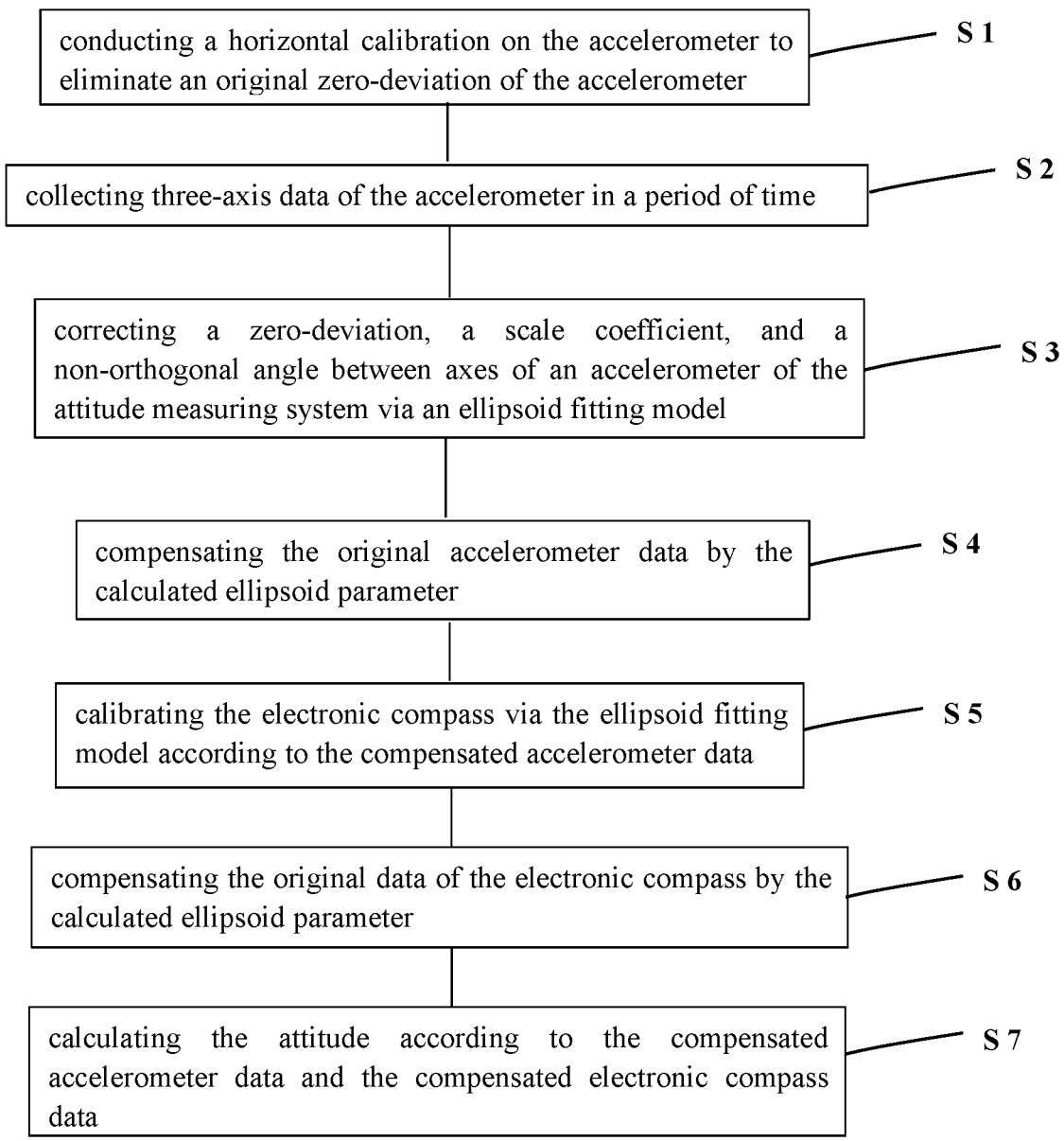
FIG. 3 is a flow chart of embodiment 3 of the precision calibration method of attitude measuring system of the present invention.

As shown in FIG. 3, a precision calibration method of attitude measuring system is provided. The precision calibration method of attitude measuring system includes the following steps:

Step S1: conducting a horizontal calibration on the accelerometer to eliminate an original zero-deviation of the accelerometer;

adjusting the attitude measurement apparatus to a horizontal position by a level bubble, and conducting a horizontal calibration on the accelerometer to eliminate the zero-deviation of the accelerometer.

Step S2: collecting three-axis data of the accelerometer in a period of time, wherein the three-axis data is recorded as $[A_{x0}, A_{y0}, A_{z0}]^T$, the zero-deviation is recorded as $B=[A_{x0}, A_{y0}, A_{z0}]^T - [0\ 0\ g]^T$.

Step S3: calibrating a zero-deviation, a scale coefficient, and a non-orthogonal angle between axes of an accelerometer of the attitude measuring system via an ellipsoid fitting model;

In the step S3: calibrating a zero-deviation, a scale coefficient, and a non-orthogonal angle between axes of an accelerometer of the attitude measuring system via an ellipsoid fitting model further comprises the following steps:

setting a fitting ellipsoid parameter vector recorded as $\alpha = [a\ b\ c\ d\ e\ f\ k\ l\ m\ n]^T$;

setting a calibration iteration number as n, expanding a first value $[A_{x0}, A_{y0}, A_{z0}]^T$ collected from the accelerometer to a ten-dimensional column vector D1, and calculating a matrix S1, wherein the D1 is recorded as $D1 = [A_{x1}^2\ A_{y1}^2\ A_{z1}^2\ A_{x1}A_{y1}\ A_{x1}A_{z1}\ A_{y1}A_{z1}\ A_{x1}\ A_{y1}\ A_{z1}\ 1]^T$, $S1 = D1^T D1$;

if times of collection of the three-axis data of the accelerometer do not reach n, updating a matrix S using the newly collected accelerometer data $D_k$, wherein $S_k = S_{k-1} + D_k^T D_k$;

after the matrix S is calculated, introducing an ellipsoid restriction matrix C and splitting the matrix S into blocks at the same time, wherein $$C = \begin{bmatrix} C_1 & C_2 \\ C_3 & C_4 \end{bmatrix},\ C_1 = \begin{bmatrix} 0 & 0 & 2 \\ 0 & -1 & 0 \\ 2 & 0 & 0 \end{bmatrix}$$

$$C_2 = 0_{3 \times 7},\ C_3 = 0_{7 \times 3},\ C_4 = 0_{7 \times 7}$$

splitting the matrix S into blocks:

$$D_k = [\,D_1\ \ D_2\,]$$

$$D_1 = [\,A_{x1}^2\ \ A_{y1}^2\ \ A_{z1}^2\,]$$

$$D_2 = [\,A_{x1}A_{y1}\ \ A_{y1}A_{z1}\ \ A_{x1}A_{z1}\ \ A_{x1}\ \ A_{y1}\ \ A_{z1}\ \ 1\,]$$

$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1 - S_2 S_4^{-1} S_2^T)\alpha_1 = \lambda \alpha_1$$

$$\alpha_2 = -S_4^{-1} S_2^T \alpha_1;$$

after $\alpha_1$ is calculated, calculating $\alpha_2$ by the above equations, such that each parameter of the ellipsoid fitting vector is calculated, wherein $\alpha = [\alpha_1\ \alpha_2] = [a\ b\ c\ d\ e\ f\ k\ l\ m\ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = \mathrm{chol}\left(\frac{A}{(B^T A B - n)}\right).$$

In the above equations, $\alpha_1$ is an eigenvector corresponding to the maximum eigenvalue of the matrix $C_1^{-1}(S_1 - S_2 S_4^{-1} S_2^T)$. Thus, in the practical calculation, not all eigenvalues and eigenvectors need to be calculated. Even the eigenvalues do not need to be calculated. Only a power-method or an inverse power-method is needed to calculated the maximum eigenvector. The inverse power-method is taken as an example:

Providing that $A = (C_1^{-1}(S_1 - S_2 S_4^{-1} S_2^T))^{-1}$, an initial iteration vector $u = [1\ 1\ 1]^T$ is taken, and an iteration precision $\varepsilon = 1e^{-6}$ is set;

conducting LU decomposition on A, namely, $A = LU$;

solving the linear equations set:

$$Ly^{(k)} = u^{(k-1)},\ Uv^{(k)} = y^{(k)}$$

$$m_k = \max(v^{(k)}),\ u^{(k)} = v^{(k)}/m_k$$

if $|m_k - m_{k-1}| < \varepsilon$, jumping out of the iteration to stop the calculation, wherein $\alpha_1 = u^{(k)}$; otherwise, $k = k+1$, and continuing the calculation.

Generally speaking, with regard to $\varepsilon = 1e^{-6}$, less than 5 iterations of the iterative calculation can achieve this precision.

Step S4: compensating the original accelerometer data by the calculated ellipsoid parameter.

Step S5: calibrating the electronic compass via the ellipsoid fitting model according to the compensated accelerometer data;

In the Step S5: calibrating the electronic compass via the ellipsoid fitting model according to the compensated accelerometer data further comprises the following steps:

setting the fitting ellipsoid parameter vector recorded as $\alpha = [a\ b\ c\ d\ e\ f\ k\ l\ m\ n]^T$;

collecting the three-axis data of the electronic compass in a period of time, and conducting an operation anti-overflow treatment on the collected data, wherein the three-axis data is recorded as $[H_{x0}\ H_{y0}\ H_{z0}]^T$;

setting the calibration iteration number as n, expanding a first value $[H_{x1}, H_{y1}, H_{z1}]^T$ collected from the electronic compass to a ten-dimensional column vector D1, calculating a matrix S1, wherein the D1 is recorded as $D1 = [H_{x1}^2\ H_{y1}^2\ H_{z1}^2\ H_{x1}H_{y1}\ H_{x1}H_{z1}\ H_{y1}H_{z1}\ H_{x1}\ H_{y1}\ H_{z1}\ 1]^T$, $S1 = D1^T D1$;

if times of collection of the three-axis data of the electronic compass do not reach n, updating the matrix S using the newly collected compass data $D_k$, wherein $S_k = S_{k-1} + D_k^T D_k$;

after the matrix S is calculated, introducing the ellipsoid restriction matrix C and splitting the matrix S into blocks at the same time, wherein $$C = \begin{bmatrix} C_1 & C_2 \\ C_3 & C_4 \end{bmatrix},\ C_1 = \begin{bmatrix} 0 & 0 & 2 \\ 0 & -1 & 0 \\ 2 & 0 & 0 \end{bmatrix}$$

$$C_2 = 0_{3 \times 7},\ C_3 = 0_{7 \times 3},\ C_4 = 0_{7 \times 7}$$

splitting the matrix S into blocks:

$$D_k = [\,D_1\ \ D_2\,]$$

$$D_1 = [\,A_{x1}^2\ \ A_{y1}^2\ \ A_{z1}^2\,]$$

$$D_2 = [\,A_{x1}A_{y1}\ \ A_{y1}A_{z1}\ \ A_{x1}A_{z1}\ \ A_{x1}\ \ A_{y1}\ \ A_{z1}\ \ 1\,]$$

$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1 - S_2 S_4^{-1} S_2^T)\alpha_1 = \lambda \alpha_1$$

$$\alpha_2 = -S_4^{-1} S_2^T \alpha_1;$$

after $\alpha_1$ is calculated, calculating $\alpha_2$ by the above equations, such that each parameter of the ellipsoid fitting vector is calculated, wherein $\alpha=[\alpha_1\ \alpha_2]=[a\ b\ c\ d\ e\ f\ k\ l\ m\ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T A B - n)}\right).$$

In the above equations, $\alpha_1$ is an eigenvector corresponding to the maximum eigenvalue of the matrix $C_1^{-1}(S_1 - S_2 S_4^{-1} S_2^T)$. Thus, in the practical calculation, not all eigenvalues and eigenvectors need to be calculated. Even the eigenvalues do not need to be calculated. Only a power-method or an inverse power-method is needed to calculate the maximum eigenvector. The inverse power-method is taken as an example:

Providing that $A=(C_1^{-1}(S_1 - S_2 S_4^{-1} S_2^T))^{-1}$, an initial iteration vector $u=[1\ 1\ 1]^T$ is taken, and an iteration precision $\varepsilon = 1e^{-6}$ is set;

conducting LU decomposition on A, namely, A=LU;
solving the linear equations set:

$$Ly^{(k)} = u^{(k-1)},\ Uv^{(k)} = y^{(k)}$$

$$m_k = \max(v^{(k)}),\ u^{(k)} = v^{(k)}/m_k$$

if $|m_k - m_{k-1}| < \varepsilon$, jumping out of the iteration to stop the calculation, wherein $\alpha_1 = u^{(k)}$, otherwise k=k+1, and continues the calculation.

Generally speaking, with regard to $\varepsilon = 1e^{-6}$, less than 5 iterations of the iterative calculation can achieve this precision.

Step S6: compensating the original data of the electronic compass by the calculated ellipsoid parameter.

Step S7: calculating the attitude according to the compensated accelerometer data and the compensated electronic compass data.

Embodiment 4

Figure 4:
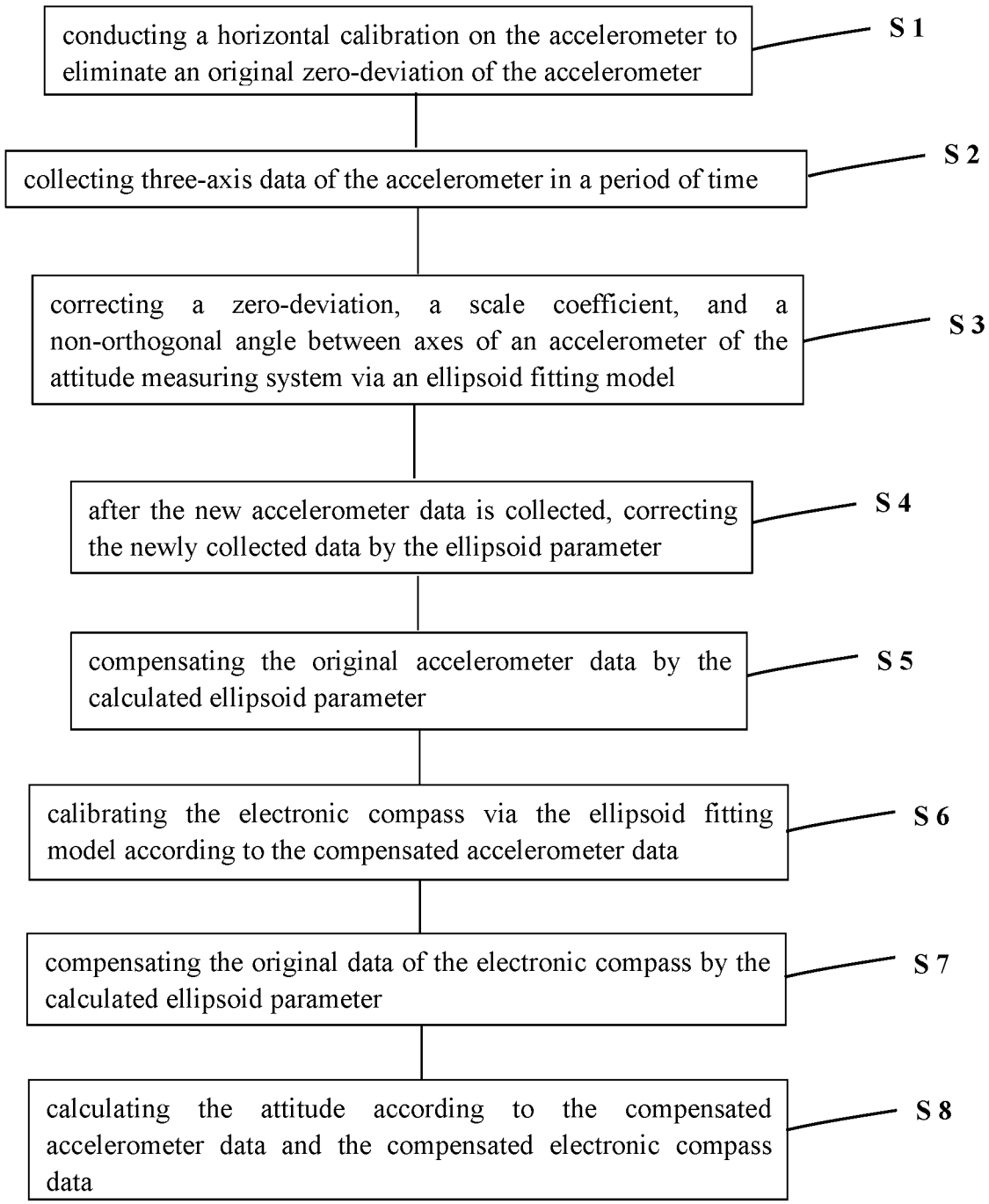
FIG. 4 is a flow chart of embodiment 4 of the precision calibration method of attitude measuring system of the present invention.

As shown in FIG. 4, a precision calibration method of attitude measuring system is provided. The precision calibration method of attitude measuring system includes the following steps:

Step S1: conducting a horizontal calibration on the accelerometer to eliminate an original zero-deviation of the accelerometer;

adjusting the attitude measurement apparatus to a horizontal position by a level bubble, and conducting a horizontal calibration on the accelerometer to eliminate the zero-deviation of the accelerometer.

Step S2: collecting three-axis data of the accelerometer in a period of time, wherein the three-axis data is recorded as $[A_{x0}, A_{y0}, A_{z0}]^T$, the zero-deviation is recorded as $B=[A_{x0}, A_{y0}, A_{z0}]^T - [0\ 0\ g]^T$.

Step S3: calibrating a zero-deviation, a scale coefficient, and a non-orthogonal angle between axes of an accelerometer of the attitude measuring system via an ellipsoid fitting model;

In the step S3: calibrating a zero-deviation, a scale coefficient, and a non-orthogonal angle between axes of an accelerometer of the attitude measuring system via an ellipsoid fitting model further comprises the following steps:

setting a fitting ellipsoid parameter vector recorded as $\alpha = [a\ b\ c\ d\ e\ f\ k\ l\ m\ n]^T$;

setting a calibration iteration number as n, expanding a first value $[A_{x0}, A_{y0}, A_{z0}]^T$ collected from the accelerometer to a ten-dimensional column vector D1, and calculating a matrix S1, wherein the D1 is recorded as $D1=[A_{x1}^2\ A_{y1}^2\ A_{z1}^2\ A_{x1}A_{y1}\ A_{x1}A_{z1}\ A_{y1}A_{z1}\ A_{x1}\ A_{y1}\ A_{z1}\ 1]^T$, $S1 = D1^T D1$;

if times of collection of the three-axis data of the accelerometer do not reach n, updating a matrix S using the newly collected accelerometer data $D_k$, wherein $S_k = S_{k-1} + D_k^T D_k$;

after the matrix S is calculated, introducing an ellipsoid restriction matrix C and splitting the matrix S into blocks at the same time, wherein $$C = \begin{bmatrix} C_1 & C_2 \\ C_3 & C_4 \end{bmatrix},\ C_1 = \begin{bmatrix} 0 & 0 & 2 \\ 0 & -1 & 0 \\ 2 & 0 & 0 \end{bmatrix}$$

$$C_2 = 0_{3\times 7},\ C_3 = 0_{7\times 3},\ C_4 = 0_{7\times 7}$$

splitting the matrix S into blocks:

$$D_k = [D_1\ D_2]$$

$$D_1 = [A_{x1}^2\ A_{y1}^2\ A_{z1}^2]$$

$$D_2 = [A_{x1}A_{y1}\ A_{y1}A_{z1}\ A_{x1}A_{z1}\ A_{x1}\ A_{y1}\ A_{z1}\ 1]$$

$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1 - S_2 S_4^{-1} S_2^T)\alpha_1 = \lambda \alpha_1$$

$$\alpha_2 = -S_4^{-1} S_2^T \alpha_1;$$

after $\alpha_1$ is calculated, calculating $\alpha_2$ by the above equations, such that each parameter of the ellipsoid fitting vector is calculated, wherein $\alpha=[\alpha_1\ \alpha_2]=[a\ b\ c\ d\ e\ f\ k\ l\ m\ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

-continued $$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T A B - n)}\right).$$

In the above equations, $\alpha_1$ is an eigenvector corresponding to the maximum eigenvalue of the matrix $C_1^{-1}(S_1-S_2 S_4^{-1} S_2^T)$. Thus, in the practical calculation, not all eigenvalues and eigenvectors need to be calculated. Even the eigenvalues do not need to be calculated. Only a power-method or an inverse power-method is needed to calculate the maximum eigenvector. The inverse power-method is taken as an example:

Providing that $A=(C_1^{-1}(S_1-S_2 S_4^{-1} S_2^T))^{-1}$, an initial iteration vector $u=[1\ 1\ 1]^T$ is taken, and an iteration precision $\varepsilon=1e^{-6}$ is set;

conducting LU decomposition on A, namely, $A=LU$;

solving the linear equations set:

$$Ly^{(k)}=u^{(k-1)},\ Uv^{(k)}=y^{(k)}$$

$$m_k=\max(v^{(k)}),\ u^{(k)}=v^{(k)}/m_k$$

if $|m_k-m_{k-1}|<\varepsilon$, jumping out of the iteration to stop the calculation, wherein $\alpha_1=u^{(k)}$; otherwise, $k=k+1$, and continuing the calculation.

Generally speaking, with regard to $\varepsilon=1e^{-6}$, less than 5 iterations of the iterative calculation can achieve this precision.

Step S4: after the new accelerometer data is collected, correcting the newly collected data by the ellipsoid parameter.

Step S5: compensating the original accelerometer data by the calculated ellipsoid parameter.

Step S6: calibrating the electronic compass via the ellipsoid fitting model according to the compensated accelerometer data;

In the Step S6: calibrating the electronic compass via the ellipsoid fitting model according to the compensated accelerometer data further comprises the following steps:

setting the fitting ellipsoid parameter vector recorded as $\alpha=[a\ b\ c\ d\ e\ f\ k\ l\ m\ n]^T$;

collecting the three-axis data of the electronic compass in a period of time, and conducting an operation anti-overflow treatment on the collected data, wherein the three-axis data is recorded as $[H_{x0}\ H_{y0}\ H_{z0}]^T$;

setting the calibration iteration number as n, expanding a first value $[H_{x1}, H_{y1}, H_{z1}]^T$ collected from the electronic compass to a ten-dimensional column vector D1, calculating a matrix S1, wherein the D1 is recorded as $D1=[H_{x1}^2\ H_{y1}^2\ H_{z1}^2\ H_{x1}H_{y1}\ H_{x1}H_{z1}\ H_{y1}H_{z1}\ H_{x1}\ H_{y1}\ H_{z1}\ 1]^T$, $S1=D1^T D1$;

if times of collection of the three-axis data of the electronic compass do not reach n, updating the matrix S using the newly collected compass data $D_k$, wherein $S_k=S_{k-1}+D_k^T D_k$;

after the matrix S is calculated, introducing the ellipsoid restriction matrix C and splitting the matrix S into blocks at the same time, wherein $$C = \begin{bmatrix} C_1 & C_2 \\ C_3 & C_4 \end{bmatrix},\ C_1 = \begin{bmatrix} 0 & 0 & 2 \\ 0 & -1 & 0 \\ 2 & 0 & 0 \end{bmatrix}$$

$$C_2 = 0_{3\times 7},\ C_3 = 0_{7\times 3},\ C_4 = 0_{7\times 7}$$

splitting the matrix S into blocks:

$$D_k=[D_1\ D_2]$$

$$D_1 = [A_{x1}^2\ A_{y1}^2\ A_{z1}^2]$$

$$D_2 = [A_{x1}A_{y1}\ A_{y1}A_{z1}\ A_{x1}A_{z1}\ A_{x1}\ A_{y1}\ A_{z1}\ 1]$$

$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1-S_2 S_4^{-1} S_2^T)\alpha_1=\lambda\alpha_1$$

$$\alpha_2=-S_4^{-1} S_2^T \alpha_1;$$

after $\alpha_1$ is calculated, calculating $\alpha_2$ by the above equations, such that each parameter of the ellipsoid fitting vector is calculated, wherein $\alpha=[\alpha_1\ \alpha_2]=[a\ b\ c\ d\ e\ f\ k\ l\ m\ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T A B - n)}\right).$$

In the above equations, $\alpha_1$ is an eigenvector corresponding to the maximum eigenvalue of the matrix $C_1^{-1}(S_1-S_2 S_4^{-1} S_2^T)$. Thus, in the practical calculation, not all eigenvalues and eigenvectors need to be calculated. Even the eigenvalues do not need to be calculated. Only a power-method or an inverse power-method is needed to calculate the maximum eigenvector. The inverse power-method is taken as an example:

Providing that $A=(C_1^{-1}(S_1-S_2 S_4^{-1} S_2^T))^{-1}$, an initial iteration vector $u=[1\ 1\ 1]^T$ is taken, and an iteration precision $\varepsilon=1e^{-6}$ is set;

conducting LU decomposition on A, namely, $A=LU$;

solving the linear equations set:

$$Ly^{(k)}=u^{(k-1)},\ Uv^{(k)}=y^{(k)}$$

$$m_k=\max(v^{(k)}),\ u^{(k)}=v^{(k)}/m_k$$

if $|m_k - m_{k-1}| < \varepsilon$, jumping out of the iteration to stop the calculation, wherein $\alpha_1 = u^{(k)}$; otherwise, $k=k+1$, and continuing the calculation.

Generally speaking, with regard to $\varepsilon = 1e^{-6}$, less than 5 iterations of the iterative calculation can achieve this precision.

Step S7: compensating the original data of the electronic compass by the calculated ellipsoid parameter.

Step S8: calculating the attitude according to the compensated accelerometer data and the compensated electronic compass data.

Embodiment 5

Figure 5:
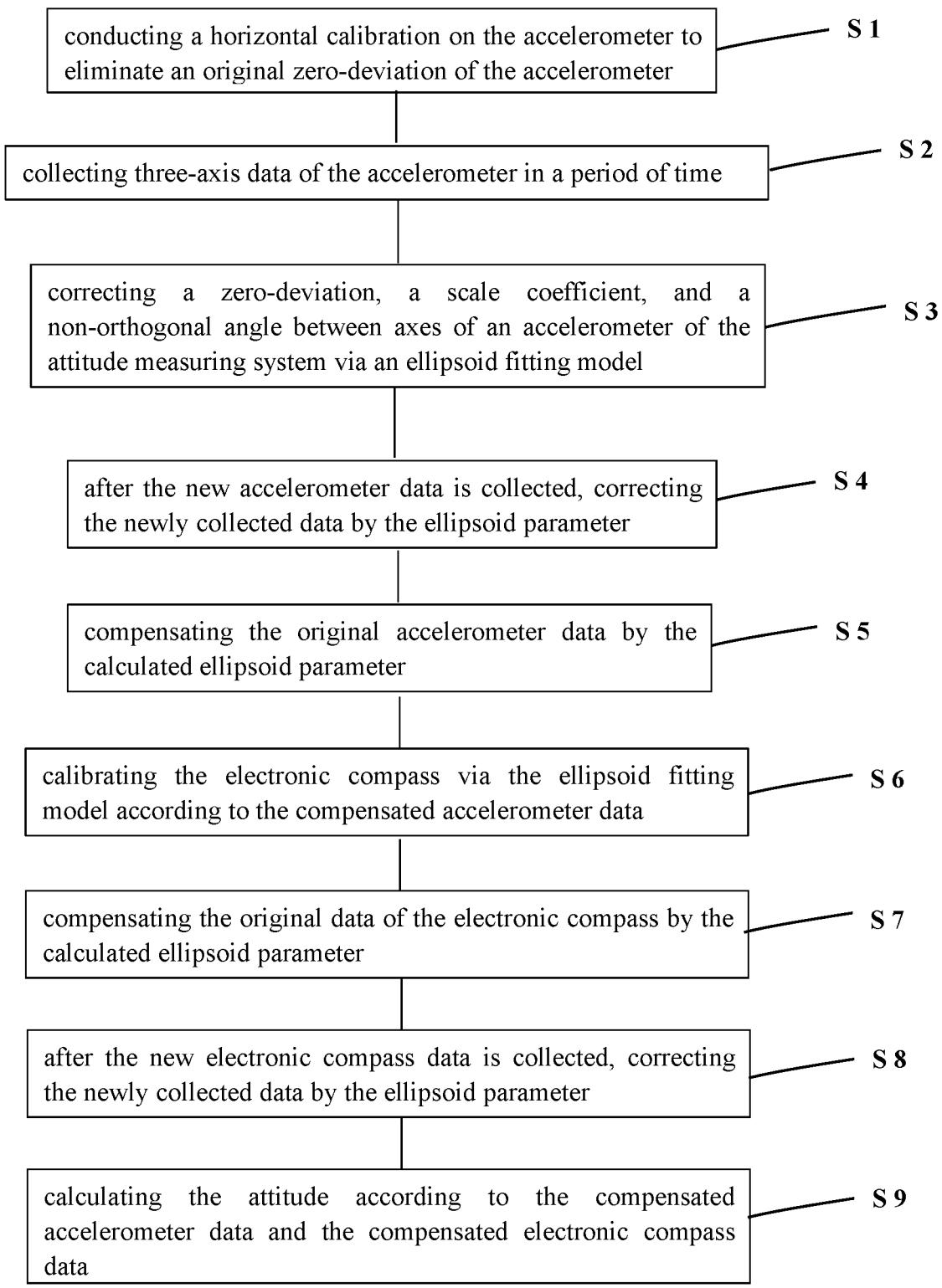
FIG. 5 is a flow chart of embodiment 5 of the precision calibration method of attitude measuring system of the present invention.

As shown in FIG. 5, a precision calibration method of attitude measuring system is provided. The precision calibration method of attitude measuring system includes the following steps:

Step S1: conducting a horizontal calibration on the accelerometer to eliminate an original zero-deviation of the accelerometer;

adjusting the attitude measurement apparatus to a horizontal position by a level bubble, and conducting a horizontal calibration on the accelerometer to eliminate the zero-deviation of the accelerometer.

Step S2: collecting three-axis data of the accelerometer in a period of time, wherein the three-axis data is recorded as $[A_{x0}, A_{y0}, A_{z0}]^T$, the zero-deviation is recorded as $B=[A_{x0}, A_{y0}, A_{z0}]^T - [0\ 0\ g]^T$.

Step S3: calibrating a zero-deviation, a scale coefficient, and a non-orthogonal angle between axes of an accelerometer of the attitude measuring system via an ellipsoid fitting model;

In the step S3: calibrating a zero-deviation, a scale coefficient, and a non-orthogonal angle between axes of an accelerometer of the attitude measuring system via an ellipsoid fitting model further comprises the following steps:

setting a fitting ellipsoid parameter vector recorded as $\alpha = [a\ b\ c\ d\ e\ f\ k\ l\ m\ n]^T$;

setting a calibration iteration number as n, expanding a first value $[A_{x0}, A_{y0}, A_{z0}]^T$ collected from the accelerometer to a ten-dimensional column vector D1, and calculating a matrix S1, wherein the D1 is recorded as $D1 = [A_{x1}^2\ A_{y1}^2\ A_{z1}^2\ A_{x1}A_{y1}\ A_{x1}A_{z1}\ A_{y1}A_{z1}\ A_{x1}\ A_{y1}\ A_{z1}\ 1]^T$, $S1 = D1^T D1$;

if times of collection of the three-axis data of the accelerometer do not reach n, updating a matrix S using the newly collected accelerometer data $D_k$, wherein $S_k = S_{k-1} + D_k^T D_k$;

after the matrix S is calculated, introducing an ellipsoid restriction matrix C and splitting the matrix S into blocks at the same time, wherein $$C = \begin{bmatrix} C_1 & C_2 \\ C_3 & C_4 \end{bmatrix}, C_1 = \begin{bmatrix} 0 & 0 & 2 \\ 0 & -1 & 0 \\ 2 & 0 & 0 \end{bmatrix}$$

$C_2 = 0_{3\times 7}, C_3 = 0_{7\times 3}, C_4 = 0_{7\times 7}$ splitting the matrix S into blocks:

$D_k = [D_1\ D_2]$ $D_1 = [A_{x1}^2\ A_{y1}^2\ A_{z1}^2]$ $D_2 = [A_{x1}A_{y1}\ A_{y1}A_{z1}\ A_{x1}A_{z1}\ A_{x1}\ A_{y1}\ A_{z1}\ 1]$

-continued $$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$C_1^{-1}(S_1 - S_2 S_4^{-1} S_2^T)\alpha_1 = \lambda \alpha_1$ $\alpha_2 = -S_4^{-1} S_2^T \alpha_1$;

after $\alpha_1$ is calculated, calculating $\alpha_2$ by the above equations, such that each parameter of the ellipsoid fitting vector is calculated, wherein $\alpha = [\alpha_1\ \alpha_2] = [a\ b\ c\ d\ e\ f\ k\ l\ m\ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T AB - n)}\right).$$

In the above equations, $\alpha_1$ is an eigenvector corresponding to the maximum eigenvalue of the matrix $C_1^{-1}(S_1 - S_2 S_4^{-1} S_2^T)$. Thus, in the practical calculation, not all eigenvalues and eigenvectors need to be calculated. Even the eigenvalues do not need to be calculated. Only a power-method or an inverse power-method is needed to calculate the maximum eigenvector. The inverse power-method is taken as an example:

Providing that $A = (C_1^{-1}(S_1 - S_2 S_4^{-1} S_2^T))^{-1}$, an initial iteration vector $u = [1\ 1\ 1]^T$ is taken, and an iteration precision $\varepsilon = 1e^{-6}$ is set;

conducting LU decomposition on A, namely, $A = LU$;

solving the linear equations set:

$Ly^{(k)} = u^{(k-1)},\ Uv^{(k)} = y^{(k)}$ $m_k = \max(v^{(k)}),\ u^{(k)} = v^{(k)}/m_k$ if $|m_k - m_k^{-1}| < \varepsilon$, jumping out of the iteration to stop the calculation, wherein $\alpha_1 = u^{(k)}$; otherwise, $k=k+1$, and continuing the calculation.

Generally speaking, with regard to $\varepsilon = 1e^{-6}$, less than 5 iterations of the iterative calculation can achieve this precision.

Step S4: after the new accelerometer data is collected, correcting the newly collected data by the ellipsoid parameter.

Step S5: compensating the original accelerometer data by the calculated ellipsoid parameter.

Step S6: calibrating the electronic compass via the ellipsoid fitting model according to the compensated accelerometer data;

In the Step S6: calibrating the electronic compass via the ellipsoid fitting model according to the compensated accelerometer data further comprises the following steps:

setting the fitting ellipsoid parameter vector recorded as $\alpha=[a\ b\ c\ d\ e\ f\ k\ l\ m\ n]^T$;

collecting the three-axis data of the electronic compass in a period of time, and conducting an operation anti-overflow treatment on the collected data, wherein the three-axis data is recorded as $[H_{x0}\ H_{y0}\ H_{z0}]^T$;

setting the calibration iteration number as n, expanding a first value $[H_{x1}, H_{y1}, H_{z1}]$ collected from the electronic compass to a ten-dimensional column vector D1, calculating a matrix S1, wherein the D1 is recorded as $D1=[H_{x1}^2\ H_{y1}^2\ H_{z1}^2\ H_{x1}H_{y1}\ H_{x1}H_{z1}\ H_{y1}H_{z1}\ H_{x1}\ H_{y1}\ H_{z1}\ 1]^T$, $S1=D1^T D1$;

if times of collection of the three-axis data of the electronic compass do not reach n, updating the matrix S using the newly collected compass data $D_k$, wherein $S_k=S_{k-1}+D_k^T D_k$;

after the matrix S is calculated, introducing the ellipsoid restriction matrix C and splitting the matrix S into blocks at the same time, wherein $$C = \begin{bmatrix} C_1 & C_2 \\ C_3 & C_4 \end{bmatrix}, C_1 = \begin{bmatrix} 0 & 0 & 2 \\ 0 & -1 & 0 \\ 2 & 0 & 0 \end{bmatrix}$$

$$C_2 = 0_{3\times 7},\ C_3 = 0_{7\times 3},\ C_4 = 0_{7\times 7}$$

splitting the matrix S into blocks:

$$D_k = [\ D_1\ \ D_2\ ]$$

$$D_1 = [\ A_{x1}^2\ \ A_{y1}^2\ \ A_{z1}^2\ ]$$

$$D_2 = [\ A_{x1}A_{y1}\ \ A_{y1}A_{z1}\ \ A_{x1}A_{z1}\ \ A_{x1}\ \ A_{y1}\ \ A_{z1}\ \ 1\ ]$$

$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1-S_2 S_4^{-1} S_2^T)\alpha_1 = \lambda \alpha_1$$

$$\alpha_2 = -S_4^{-1} S_2^T \alpha_1;$$

after $\alpha_1$ is calculated, calculating $\alpha_2$ by the above equations, such that each parameter of the ellipsoid fitting vector is calculated, wherein $\alpha=[\alpha_1\ \alpha_2]=[a\ b\ c\ d\ e\ f\ k\ l\ m\ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T AB - n)}\right).$$

In the above equations, $\alpha_1$ is an eigenvector corresponding to the maximum eigenvalue of the matrix $C_1^{-1}(S_1-S_2 S_4^{-1} S_2^T)$. Thus, in the practical calculation, not all eigenvalues and eigenvectors need to be calculated. Even the eigenvalues do not need to be calculated. Only a power-method or an inverse power-method is needed to calculate the maximum eigenvector. The inverse power-method is taken as an example:

Providing that $A=(C_1^{-1}(S_1-S_2 S_4^{-1} S_2^T))^{-1}$, an initial iteration vector $u=[1\ 1\ 1]^T$ is taken, and an iteration precision $\varepsilon=1e^{-6}$ is set;

conducting LU decomposition for A, namely, $A=LU$;
solving the linear equations set:

$$Ly^{(k)}=u^{(k-1)},\ Uv^{(k)}=y^{(k)}$$

$$m_k=\max(v^{(k)}),\ u^{(k)}=v^{(k)}/m_k$$

if $|m_k-m_{k-1}|<\varepsilon$, jumping out of the iteration to stop the calculation, wherein $\alpha_1=u^{(k)}$; otherwise, $k=k+1$, and continuing the calculation.

Generally speaking, with regard to $\varepsilon=1e^{-6}$, less than 5 iterations of the iterative calculation can achieve this precision.

Step S7: compensating the original data of the electronic compass by the calculated ellipsoid parameter.

Step S8: after the new electronic compass data is collected, correcting the newly collected data by the ellipsoid parameter.

Step S9: calculating the attitude according to the compensated accelerometer data and the compensated electronic compass data.

Embodiment 6

Figure 6:
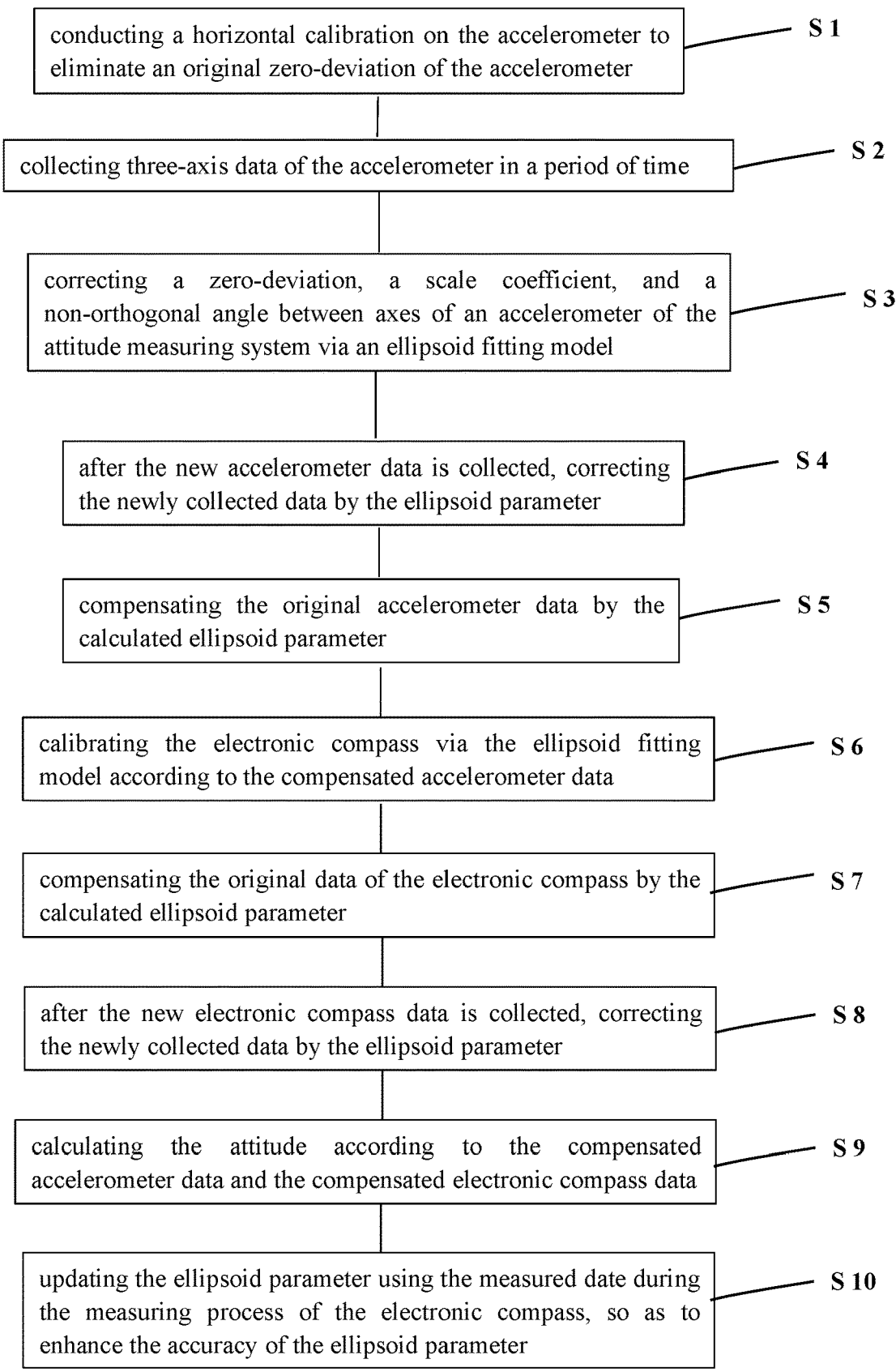
FIG. 6 is a flow chart of embodiment 6 of the precision calibration method of attitude measuring system of the present invention.

As shown in FIG. 6, a precision calibration method of attitude measuring system is provided. The precision calibration method of attitude measuring system includes the following steps:

Step S1: conducting a horizontal calibration on the accelerometer to eliminate an original zero-deviation of the accelerometer;

adjusting the attitude measurement apparatus to a horizontal position by a level bubble, and conducting a horizontal calibration on the accelerometer to eliminate the zero-deviation of the accelerometer.

Step S2: collecting three-axis data of the accelerometer in a period of time, wherein the three-axis data is recorded as $[A_{x0}, A_{y0}, A_{z0}]^T$, the zero-deviation is recorded as $B=[A_{x0}, A_{y0}, A_{z0}]^T-[0\ 0\ g]^T$.

Step S3: calibrating a zero-deviation, a scale coefficient, and a non-orthogonal angle between axes of an accelerometer of the attitude measuring system via an ellipsoid fitting model;

In the step S3: calibrating a zero-deviation, a scale coefficient, and a non-orthogonal angle between axes of an accelerometer of the attitude measuring system via an ellipsoid fitting model further comprises the following steps:
setting a fitting ellipsoid parameter vector recorded as $\alpha=[a\ b\ c\ d\ e\ f\ k\ l\ m\ n]^T$;

setting a calibration iteration number as n, expanding a first value $[A_{x0}, A_{y0}, A_{z0}]^T$ collected from the accelerometer to a ten-dimensional column vector D1, and calculating a matrix S1, wherein the D1 is recorded as $D1=[A_{x1}^2\ A_{y1}^2\ A_{z1}^2\ A_{x1}A_{y1}\ A_{x1}A_{z1}\ A_{y1}A_{z1}\ A_{x1}\ A_{y1}\ A_{z1}\ 1]^T$, $S1=D1^T D1$;

if times of collection of the three-axis data of the accelerometer do not reach n, updating a matrix S using the newly collected accelerometer data $D_k$, wherein $S_k=S_{k-1}+D_k^T D_k$;

after the matrix S is calculated, introducing an ellipsoid restriction matrix C and splitting the matrix S into blocks at the same time, wherein $$C = \begin{bmatrix} C_1 & C_2 \\ C_3 & C_4 \end{bmatrix}, C_1 = \begin{bmatrix} 0 & 0 & 2 \\ 0 & -1 & 0 \\ 2 & 0 & 0 \end{bmatrix}$$

$$C_2 = 0_{3\times 7}, C_3 = 0_{7\times 3}, C_4 = 0_{7\times 7}$$

splitting the matrix S into blocks:

$$D_k = [D_1 D_2]$$

$$D_k = [D_1 \quad D_2]$$
$$D_1 = [A_{x1}^2 \quad A_{y1}^2 \quad A_{z1}^2]$$
$$D_2 = [A_{x1}A_{y1} \quad A_{y1}A_{z1} \quad A_{x1}A_{z1} \quad A_{x1} \quad A_{y1} \quad A_{z1} \quad 1]$$
$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1 - S_2 S_4^{-1} S_2^T)\alpha_1 = \lambda \alpha_1$$

$$\alpha_2 = -S_4^{-1} S_2^T \alpha_1;$$

after $\alpha_1$ is calculated, calculating $\alpha_2$ by the above equations, such that each parameter of the ellipsoid fitting vector is calculated, wherein $\alpha = [\alpha_1 \ \alpha_2] = [a \ b \ c \ d \ e \ f \ k \ l \ m \ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T A B - n)}\right).$$

In the above equations, $\alpha_1$ is an eigenvector corresponding to the maximum eigenvalue of the matrix $C_1^{-1}(S_1 - S_2 S_4^{-1} S_2^T)$. Thus, in the practical calculation, not all eigenvalues and eigenvectors need to be calculated. Even the eigenvalues don't need to be calculated. Only a power-method or an inverse power-method is needed to calculate the maximum eigenvector The inverse power-method is taken as an example:

Providing that $A = (C_1^{-1}(S_1 - S_2 S_4^{-1} S_2^T))^{-1}$, an initial iteration vector $u = [1\ 1\ 1]^T$ is taken, and an iteration precision $\varepsilon = 1e^{-6}$ is set;
conducting LU decomposition on A, namely, A=LU;
solving the linear equations set:

$$Ly^{(k)} = u^{(k-1)}, \ Uv^{(k)} = y^{(k)}$$

$$m_k = \max(v^{(k)}), \ u^{(k)} = v^{(k)}/m_k$$

if $|m_k - m_{k-1}| < \varepsilon$, jumping out of the iteration and to stop the calculation, wherein $\alpha_1 = u^{(k)}$; otherwise, k=k+1, and continuing the calculation.

Generally speaking, with regard to $\varepsilon = 1e^{-6}$, less than 5 iterations of the iterative calculation can achieve this precision.

Step S4: after the new accelerometer data is collected, correcting the newly collected data by the ellipsoid parameter.

Step S5: compensating the original accelerometer data by the calculated ellipsoid parameter.

Step S6: calibrating the electronic compass via the ellipsoid fitting model according to the compensated accelerometer data;

In the Step S6: calibrating the electronic compass via the ellipsoid fitting model according to the compensated accelerometer data further comprises the following steps:

setting the fitting ellipsoid parameter vector recorded as $\alpha = [a\ b\ c\ d\ e\ f\ k\ l\ m\ n]^T$;

collecting the three-axis data of the electronic compass in a period of time, and conducting an operation anti-overflow treatment on the collected data, wherein the three-axis data is recorded as $[H_{x0}\ H_{y0}\ H_{z0}]^T$;

setting the calibration iteration number as n, expanding a first value $[H_{x1}, H_{y1}, H_{z1}]^T$ collected from the electronic compass to a ten-dimensional column vector D1, calculating a matrix S1, wherein the D1 is recorded as $D1 = [H_{x1}^2\ H_{y1}^2\ H_{z1}^2\ H_{x1}H_{y1}\ H_{x1}H_{z1}\ H_{y1}H_{z1}\ H_{x1}\ H_{y1}\ H_{z1}\ 1]^T$, $S1 = D1^T D1$;

if times of collection of the three-axis data of the electronic compass do not reach n, updating the matrix S using the newly collected compass data $D_k$, wherein $S_k = S_{k-1} + D_k^T D_k$;

after the matrix S is calculated, introducing the ellipsoid restriction matrix C and splitting the matrix S into blocks at the same time, wherein $$C = \begin{bmatrix} C_1 & C_2 \\ C_3 & C_4 \end{bmatrix}, C_1 = \begin{bmatrix} 0 & 0 & 2 \\ 0 & -1 & 0 \\ 2 & 0 & 0 \end{bmatrix}$$

$$C_2 = 0_{3\times 7}, C_3 = 0_{7\times 3}, C_4 = 0_{7\times 7}$$

splitting the matrix S into blocks:

$$D_k = [D_1 \quad D_2]$$
$$D_1 = [A_{x1}^2 \quad A_{y1}^2 \quad A_{z1}^2]$$
$$D_2 = [A_{x1}A_{y1} \quad A_{y1}A_{z1} \quad A_{x1}A_{z1} \quad A_{x1} \quad A_{y1} \quad A_{z1} \quad 1]$$
$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1-S_2S_4^{-1}S_2^T)\alpha_1=\lambda\alpha_1$$

$$\alpha_2=-S_4^{-1}S_2^T\alpha_1;$$

after $\alpha_1$ is calculated, calculating $\alpha_2$ by the above equations, such that each parameter of the ellipsoid fitting vector is calculated, wherein $\alpha=[\alpha_1\ \alpha_2]=[a\ b\ c\ d\ e\ f\ k\ l\ m\ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^TAB-n)}\right).$$

In the above equations, $\alpha_1$ is an eigenvector corresponding to the maximum eigenvalue of the matrix $C_1^{-1}(S_1-S_2S_4^{-1}S_2^T)$. Thus, in the practical calculation, not all eigenvalues and eigenvectors need to be calculated. Even the eigenvalues do not need to be calculated. Only a power-method or an inverse power-method is needed to calculate the maximum eigenvector. The inverse power-method is taken as an example:

Providing that $A=(C_1^{-1}(S_1-S_2S_4^{-1}S_2^T))^{-1}$, an initial iteration vector $u=[1\ 1\ 1]^T$ is taken, and an iteration precision $\varepsilon=1e^{-6}$ is set;

conducting LU decomposition on A, namely, A=LU;
solving the linear equations set:

$$Ly^{(k)}=u^{(k-1)},\ Uv^{(k)}=y^{(k)}$$

$$m_k=\max(v^{(k)}),\ u^{(k)}=v^{(k)}/m_k$$

if $|m_k-m_{k-1}|<\varepsilon$, jumping out of the iteration and to stop the calculation, wherein $\alpha_1=u^{(k)}$; otherwise, k=k+1, and continuing the calculation.

Generally speaking, with regard to $\varepsilon=1e^{-6}$, less than 5 iterations of the iterative calculation can achieve this precision.

Step S7: compensating the original data of the electronic compass by the calculated ellipsoid parameter.

Step S8: after the new electronic compass data is collected, correcting the newly collected data by the ellipsoid parameter.

Step S9: calculating the attitude according to the compensated accelerometer data and the compensated electronic compass data.

Step S10: updating the ellipsoid parameter using the measured date during the measuring process of the electronic compass, so as to enhance the accuracy of the ellipsoid parameter.

Embodiment 7

Figure 7:
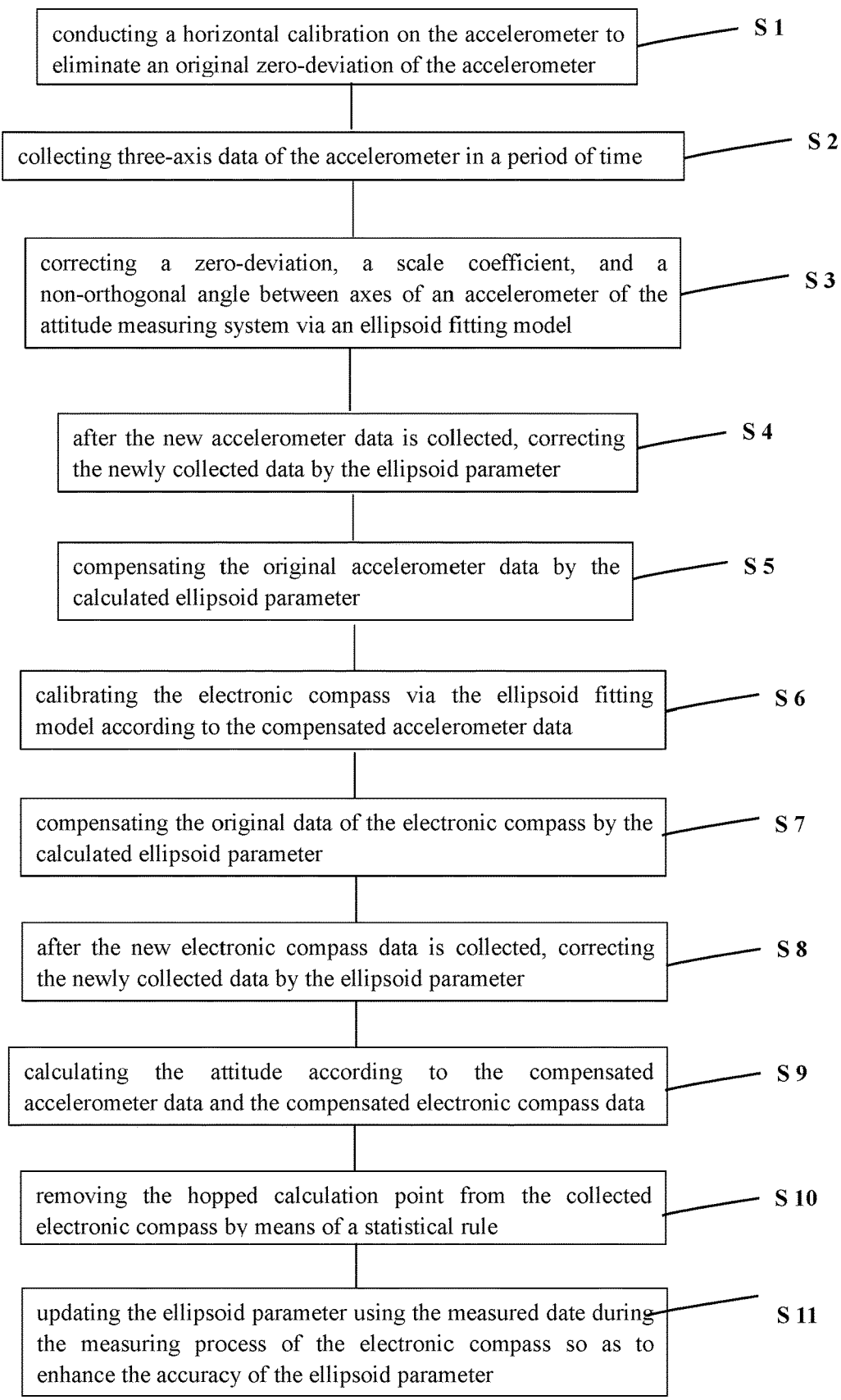
FIG. 7 is a flow chart embodiment 7 of the precision calibration method of attitude measuring system of the present invention.

As shown in FIG. 7, a precision calibration method of attitude measuring system is provided. The precision calibration method of attitude measuring system includes the following steps:

Step S1: conducting a horizontal calibration on the accelerometer to eliminate an original zero-deviation of the accelerometer;

adjusting the attitude measurement apparatus to a horizontal position by a level bubble, and conducting a horizontal calibration on the accelerometer to eliminate the zero-deviation of the accelerometer.

Step S2: collecting three-axis data of the accelerometer in a period of time, wherein the three-axis data is recorded as $[A_{x0}, A_{y0}, A_{z0}]^T$, the zero-deviation is recorded as $B=[A_{x0}, A_{y0}, A_{z0}]^T-[0\ 0\ g]^T$.

Step S3: calibrating a zero-deviation, a scale coefficient, and a non-orthogonal angle between axes of an accelerometer of the attitude measuring system via an ellipsoid fitting model;

In the step S3: calibrating a zero-deviation, a scale coefficient, and a non-orthogonal angle between axes of an accelerometer of the attitude measuring system via an ellipsoid fitting model further comprises the following steps: setting a fitting ellipsoid parameter vector recorded as $\alpha=[a\ b\ c\ d\ e\ f\ k\ l\ m\ n]^T$;

setting a calibration iteration number as n, expanding a first value $[A_{x0}, A_{y0}, A_{z0}]^T$ collected from the accelerometer to a ten-dimensional column vector D1, and calculating a matrix S1, wherein the D1 is recorded as $D1=[A_{x1}^2\ A_{y1}^2\ A_{z1}^2\ A_{x1}A_{y1}\ A_{x1}A_{z1}\ A_{y1}A_{z1}\ A_{x1}\ A_{y1}\ A_{z1}\ 1]^T$, $S1=D1^TD1$;

if times of collection of the three-axis data of the accelerometer do not reach n, updating a matrix S using the newly collected accelerometer data $D_k$, wherein $S_k=S_{k-1}+D_k^TD_k$;

after the matrix S is calculated, introducing an ellipsoid restriction matrix C and splitting the matrix S into blocks at the same time, wherein $$C = \begin{bmatrix} C_1 & C_2 \\ C_3 & C_4 \end{bmatrix},\ C_1 = \begin{bmatrix} 0 & 0 & 2 \\ 0 & -1 & 0 \\ 2 & 0 & 0 \end{bmatrix}$$

$$C_2 = 0_{3\times 7},\ C_3 = 0_{7\times 3},\ C_4 = 0_{7\times 7}$$

splitting the matrix S into blocks:

$$D_k = [\ D_1\ \ D_2\ ]$$

$$D_1 = [\ A_{x1}^2\ \ A_{y1}^2\ \ A_{z1}^2\ ]$$

$$D_2 = [\ A_{x1}A_{y1}\ \ A_{y1}A_{z1}\ \ A_{x1}A_{z1}\ \ A_{x1}\ \ A_{y1}\ \ A_{z1}\ \ 1\ ]$$

$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1-S_2S_4^{-1}S_2^T)\alpha_1=\lambda\alpha_1$$

$$\alpha_2=-S_4^{-1}S_2^T\alpha_1;$$

after $\alpha_1$ is calculated, calculating $\alpha_2$ by the above equations, such that each parameter of the ellipsoid fitting vector is calculated, wherein $\alpha=[\alpha_1\ \alpha_2]=[a\ b\ c\ d\ e\ f\ k\ l\ m\ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T A B - n)}\right).$$

In the above equations, $\alpha_1$ is an eigenvector corresponding to the maximum eigenvalue of the matrix $C_1^{-1}(S_1 - S_2 S_4^{-1} S_2^T)$. Thus, in the practical calculation, not all eigenvalues and eigenvectors need to be calculated. Even the eigenvalues do not need to be calculated. Only a power-method or an inverse power-method is needed to calculate the maximum eigenvector. The inverse power-method is taken as an example:

Providing that $A = (C_1^{-1}(S_1 - S_2 S_4^{-1} S_2^T))^{-1}$, an initial iteration vector $u = [1\ 1\ 1]^T$ is taken, and an iteration precision $\varepsilon = 1e^{-6}$ is taken;

conducting LU decomposition on A, namely, A=LU;
solving the linear equations set:

$$Ly^{(k)} = u^{(k-1)},\ Uv^{(k)} = y^{(k)}$$

$$m_k = \max(v^{(k)}),\ u^{(k)} = v^{(k)}/m_k$$

if $|m_k - m_{k-1}| < \varepsilon$, jumping out of the iteration to stop the calculation, wherein $\alpha_1 = u^{(k)}$; otherwise, k=k+1, continuing the calculation.

Generally speaking, with regard to $\varepsilon = 1e^{-6}$, less than 5 iterations of the iterative calculation can achieve this precision.

Step S4: after the new accelerometer data is collected, correcting the newly collected data by the ellipsoid parameter.

Step S5: compensating the original accelerometer data by the calculated ellipsoid parameter.

Step S6: calibrating the electronic compass via the ellipsoid fitting model according to the compensated accelerometer data;

In the Step S6: calibrating the electronic compass via the ellipsoid fitting model according to the compensated accelerometer data further comprises the following steps:

setting the fitting ellipsoid parameter vector recorded as $\alpha = [a\ b\ c\ d\ e\ f\ k\ l\ m\ n]^T$;

collecting the three-axis data of the electronic compass in a period of time, and conducting an operation anti-overflow treatment on the collected data, wherein the three-axis data is recorded as $[H_{x0}\ H_{y0}\ H_{z0}]^T$;

setting the calibration iteration number as n, expanding a first value $[H_{x1}, H_{y1}, H_{z1}]$ collected from the electronic compass to a ten-dimensional column vector D1, calculating a matrix S1, wherein the D1 is recorded as $D1 = [H_{x1}^2\ H_{y1}^2\ H_{z1}^2\ H_{x1}H_{y1}\ H_{x1}H_{z1}\ H_{y1}H_{z1}\ H_{x1}\ H_{y1}\ H_{z1}\ 1]^T$, $S1 = D1^T D1$;

if times of collection of the three-axis data of the electronic compass do not reach n, updating the matrix S using the newly collected compass data $D_k$, wherein $S_k = S_{k-1} + D_k^T D_k$;

after the matrix S is calculated, introducing the ellipsoid restriction matrix C and splitting the matrix S into blocks at the same time, wherein $$C = \begin{bmatrix} C_1 & C_2 \\ C_3 & C_4 \end{bmatrix},\ C_1 = \begin{bmatrix} 0 & 0 & 2 \\ 0 & -1 & 0 \\ 2 & 0 & 0 \end{bmatrix}$$

$$C_2 = 0_{3\times 7},\ C_3 = 0_{7\times 3},\ C_4 = 0_{7\times 7}$$

splitting the matrix S into blocks:

$$D_k = [\ D_1\ \ D_2\ ]$$

$$D_1 = [\ A_{x1}^2\ \ A_{y1}^2\ \ A_{z1}^2\ ]$$

$$D_2 = [\ A_{x1}A_{y1}\ \ A_{y1}A_{z1}\ \ A_{x1}A_{z1}\ \ A_{x1}\ \ A_{y1}\ \ A_{z1}\ \ 1\ ]$$

$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1 - S_2 S_4^{-1} S_2^T)\alpha_1 = \lambda \alpha_1$$

$$\alpha_2 = -S_4^{-1} S_2^T \alpha_1;$$

after $\alpha_1$ is calculated, calculating $\alpha_2$ by the above equations, such that each parameter of the ellipsoid fitting vector is calculated, wherein $\alpha = [\alpha_1\ \alpha_2] = [a\ b\ c\ d\ e\ f\ k\ l\ m\ n]^T$;

furthermore, with reference to the actual physical correspondence, the three-axis scale coefficients $k_x, k_y, k_z$, the non-orthogonal angles between axes $\delta_{xy}, \delta_{yz}, \delta_{xz}$, and the residual zero-deviations $b_x, b_y, b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T A B - n)}\right).$$

In the above equations, $\alpha_1$ is an eigenvector corresponding to the maximum eigenvalue of the matrix $C_1^{-1}(S_1 - S_2 S_4^{-1} S_2^T)$. Thus, in the practical calculation, not all eigenvalues and eigenvectors need to be calculated. Even the eigenvalues do not need to be calculated. Only a power-method or an inverse power-method is needed to calculate the maximum eigenvector. The inverse power-method is taken as an example:

Providing that $A = (C_1^{-1}(S_1 - S_2 S_4^{-1} S_2^T))^{-1}$, an initial iteration vector $u = [1\ 1\ 1]^T$ is taken, an iteration precision $\varepsilon = 1e^{-6}$ is set;

conducting LU decomposition on A, namely, A=LU;
solving the linear equations set:

$$Ly^{(k)} = u^{(k-1)},\ Uv^{(k)} = y^{(k)}$$

$$m_k = \max(v^{(k)}),\ u^{(k)} = v^{(k)}/m_k$$

if $|m_k - m_{k-1}| < \varepsilon$, jumping out of the iteration to stop the calculation, wherein $\alpha_1 = u^{(k)}$; otherwise, k=k+1, and continuing the calculation.

Generally speaking, with regard to $\varepsilon=1e^{-6}$, less than 5 iterations of the iterative calculation can achieve this precision.

Step S7: compensating the original data of the electronic compass by the calculated ellipsoid parameter.

Step S8: after the new electronic compass data is collected, correcting the newly collected data by the ellipsoid parameter.

Step S9: calculating the attitude according to the compensated accelerometer data and the compensated electronic compass data.

Step S10: removing the hopped calculation point in the collected electronic compass by means of a statistical rule.

Step S11: updating the ellipsoid parameter using the measured date during the measuring process of the electronic compass, so as to enhance the accuracy of the ellipsoid parameter.

The advantages of the present invention are as below. The method of ellipsoid fitting is used to calibrate the electronic compass and the acceleration in the attitude measuring system. Thus, the problems of accidental output abnormality of the sensor and hops are effectively avoided, such that the reliability of calibration result is effectively ensured. The recursive processing is conducted in the ellipsoid fitting algorithm such that the internal CPU of the attitude measuring system does not need to store the data of all points previously collected by the sensor during the data processing. Only the matrix previously obtained by recurrence and the current measurement result are required to be stored. Therefore, under the same hardware environment, the ellipsoid fitting method can handle more values, thereby improving the precision of the ellipsoid fitting. Correspondingly, when the conventional fitting algorithm is used, in order to ensure that the memory stack does not overflow during the operation process, the CPU can only conduct the fitting operation based on a few sample points. As a result, the fitting precision is limited. The present invention improved a large-scale of matrix operation in the ellipsoid fitting algorithm, and optimized the calculation procedure, such that the calculation of the ellipsoid fitting is reduced by over 90 percent. Taking the MATLAB program as an example, based on the conventional algorithm, operating the fitting algorithm one time would consume 563 ms. In contrast, the improved algorithm only consumes 14 ms. The strategy in which the measured data is used for calibrating is employed, such that the fault-tolerant capability of the calibration is improved. Thus, the requirement of initial calibration is reduced, and the operation complexity for the user is simplified.

The above mentioned is only the specific embodiment of the present invention. However, the protective scope of the present invention is not limited herein. The artisans familiar with the technical field can come up with a variation or replacement readily within the disclosed scope, which are all supposed to fall within the protective scope of the present invention. Thus, the protection scope of the present invention shall be subject to the protection scope of the appended claims.

What is claimed is:

1. A precision calibration method of attitude measuring system wherein, the precision calibration method of attitude measuring system comprises the following steps:
   calibrating a zero-deviation, a scale coefficient, and a non-orthogonal angle between axes of an accelerometer of the attitude measuring system via an ellipsoid fitting model;
   compensating original data of the accelerometer using a calculated ellipsoid parameter;
   calibrating an electronic compass via the ellipsoid fitting model according to compensated accelerometer data;
   compensating original electronic compass data by the calculated ellipsoid parameter; and
   calculating an attitude according to the compensated accelerometer data and compensated electronic compass data.

2. The precision calibration method of attitude measuring system of claim 1 wherein, before the step of calibrating the zero-deviation, the scale coefficient, and the non-orthogonal angle between axes of the accelerometer of the attitude measuring system via the ellipsoid fitting model is conducted, the following step is conducted:
   conducting a horizontal calibration on the accelerometer to eliminate an original zero-deviation of the accelerometer.

3. The precision calibration method of attitude measuring system of claim 2 wherein, after the step of conducting the horizontal calibration on the accelerometer to eliminate the original zero-deviation of the accelerometer is conducted, the following step is conducted:
   collecting three-axis data of the accelerometer in a period of time, wherein the three-axis data is recorded as $[A_{x0}, A_{y0}, A_{z0}]^T$, and the zero-deviation is recorded as $B=[A_{x0}, A_{y0}, A_{z0}]^T-[0\ 0\ g]^T$.

4. The precision calibration method of attitude measuring system of claim 3 wherein, the step of calibrating the zero-deviation, the scale coefficient, and the non-orthogonal angle between axes of the accelerometer of the attitude measuring system via the ellipsoid fitting model further comprises the following steps:
   setting a fitting ellipsoid parameter vector recorded as $\alpha=[a\ b\ c\ d\ e\ f\ k\ l\ m\ n]^T$;
   setting a calibration iteration number as n, expanding a first value $[A_{x0}, A_{y0}, A_{z0}]^T$ collected from the accelerometer to a ten-dimensional column vector D1, and calculating a matrix S1, wherein the D1 is recorded as $D1=[A_{x1}^2\ A_{y1}^2\ A_{z1}^2\ A_{x1}A_{y1}\ A_{x1}A_{z1}\ A_{y1}A_{z1}\ A_{x1}\ A_{y1}\ A_{z1}\ 1]^T$, $S1=D1^TD1$;
   when times of collection of the three-axis data of the accelerometer does not reach n, updating a matrix S using newly collected accelerometer data $D_k$, wherein $S_k=S_{k-1}+D_k^TD_k$;
   after the matrix S is calculated, introducing an ellipsoid restriction matrix C and splitting the matrix S into blocks at the same time, wherein $$C = \begin{bmatrix} C_1 & C_2 \\ C_3 & C_4 \end{bmatrix}, C_1 = \begin{bmatrix} 0 & 0 & 2 \\ 0 & -1 & 0 \\ 2 & 0 & 0 \end{bmatrix}$$

$$C_2 = 0_{3\times 7},\ C_3 = 0_{7\times 3},\ C_4 = 0_{7\times 7}$$

splitting the matrix S into blocks:

$$D_k = [\ D_1\ \ D_2\ ]$$
$$D_1 = [\ A_{x1}^2\ \ A_{y1}^2\ \ A_{z1}^2\ ]$$
$$D_2 = [\ A_{x1}A_{y1}\ \ A_{y1}A_{z1}\ \ A_{x1}A_{z1}\ \ A_{x1}\ \ A_{y1}\ \ A_{z1}\ \ 1\ ]$$

-continued $$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1 - S_2 S_4^{-1} S_2^T)\alpha_1 = \lambda \alpha_1$$

$$\alpha_2 = -S_4^{-1} S_2^T \alpha_1;$$

after $\alpha_1$ is calculated, calculating $\alpha_2$ by the above equations, such that each parameter of the ellipsoid fitting vector is calculated, wherein $\alpha = [\alpha_1 \ \alpha_1] = [a\ b\ c\ d\ e\ f\ k\ l\ m\ n]^T$;

furthermore, with reference to an actual physical correspondence, the three-axis scale coefficients $k_x$, $k_y$, $k_z$, the non-orthogonal angles between axes $\delta_{xy}$, $\delta_{yz}$, $\delta_{xz}$, and the residual zero-deviations $b_x$, $b_y$, $b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T AB - n)}\right).$$

5. The precision calibration method of attitude measuring system of claim 4 wherein, after the step of calibrating the zero-deviation, the scale coefficient, and the non-orthogonal angle between axes of the accelerometer of the attitude measuring system via the ellipsoid fitting model is conducted, the following step is conducted:
  after new accelerometer data is collected, correcting newly collected data using the ellipsoid parameter.

6. The precision calibration method of attitude measuring system of claim 5 wherein, the step of calibrating the electronic compass via the ellipsoid fitting model according to the compensated accelerometer data further comprises the following steps:
  setting the fitting ellipsoid parameter vector recorded as $\alpha = [a\ b\ c\ d\ e\ f\ k\ l\ m\ n]^T$;
  collecting the three-axis data of the electronic compass in a period of time, and conducting an operation anti-overflow treatment on collected data, wherein the three-axis data is recorded as $[H_{x0}\ H_{y0}\ H_{z0}]^T$;
  setting the calibration iteration number as n, expanding a first value $[H_{x1}, H_{y1}, H_{z1}]^T$ collected from the electronic compass to a ten-dimensional column vector D1, and calculating a matrix S1, wherein the D1 is recorded as $D1 = [H_{x1}^2\ H_{y1}^2\ H_{z1}^2\ H_{x1}H_{y1}\ H_{x1}H_{z1}\ H_{y1}H_{z1}\ H_{x1}\ H_{y1}\ H_{z1}\ 1]^T$, wherein $S1 = D1^T D1$;
  when times of collection of the three-axis data of the electronic compass do not reach n, updating the matrix S using the newly collected compass data $D_k$, wherein $S_k = S_{k-1} + D_k^T D_k$;
  after the matrix S is calculated, introducing the ellipsoid restriction matrix C and splitting the matrix S into blocks at the same time, wherein $$C = \begin{bmatrix} C_1 & C_2 \\ C_3 & C_4 \end{bmatrix}, C_1 = \begin{bmatrix} 0 & 0 & 2 \\ 0 & -1 & 0 \\ 2 & 0 & 0 \end{bmatrix}$$

$$C_2 = 0_{3\times 7},\ C_3 = 0_{7\times 3},\ C_4 = 0_{7\times 7}$$

splitting the matrix S into blocks:

$$D_k = [D_1 \ D_2]$$

$$D_1 = [A_{x1}^2 \ A_{y1}^2 \ A_{z1}^2]$$

$$D_2 = [A_{x1}A_{y1} \ A_{y1}A_{z1} \ A_{x1}A_{z1} \ A_{x1} \ A_{y1} \ A_{z1} \ 1]$$

$$S = D_k^T D_k = \begin{bmatrix} D_1^T D_1 & D_1^T D_2 \\ D_2^T D_1 & D_2^T D_2 \end{bmatrix} = \begin{bmatrix} S_1 & S_2 \\ S_3 & S_4 \end{bmatrix}$$

calculating the ellipsoid fitting vector by the following equations:

$$C_1^{-1}(S_1 - S_2 S_4^{-1} S_2^T)\alpha_1 = \lambda \alpha_1$$

$$\alpha_2 = -S_4^{-1} S_2^T \alpha_1;$$

after $\alpha_1$ is calculated, calculating $\alpha_2$ by the above equations, such that each parameter of the ellipsoid fitting vector is calculated, wherein $\alpha = [\alpha_1 \ \alpha_1] = [a\ b\ c\ d\ e\ f\ k\ l\ m\ n]^T$;

furthermore, with reference to the actual physical correspondence, the three-axis scale coefficients $k_x$, $k_y$, $k_z$, the non-orthogonal angles between axes $\delta_{xy}$, $\delta_{yz}$, $\delta_{xz}$, and the residual zero-deviations $b_x$, $b_y$, $b_z$ can be calculated by the following equations:

$$A = \begin{bmatrix} a & d & e \\ d & b & f \\ e & f & c \end{bmatrix}$$

$$B = \begin{bmatrix} b_x \\ b_y \\ b_z \end{bmatrix} = A^{-1} \begin{bmatrix} k \\ l \\ m \end{bmatrix}$$

$$A_e = \begin{bmatrix} k_x & \delta_{xy} & \delta_{xz} \\ 0 & k_y & \delta_{yz} \\ 0 & 0 & k_z \end{bmatrix} = chol\left(\frac{A}{(B^T AB - n)}\right).$$

7. The precision calibration method of attitude measuring system of claim 6 wherein, after the step of calibrating the electronic compass according to the compensated accelerometer data via the ellipsoid fitting model is conducted, the following step is conducted:
  after new electronic compass data is collected, correcting the newly collected data using the ellipsoid parameter.

8. The precision calibration method of attitude measuring system of claim 7 wherein, after the step of calculating the attitude according to the compensated accelerometer data and the compensated electronic compass data is conducted, the following step is conducted:
  updating the ellipsoid parameter by the electronic compass using measured data during a measuring process, so as to enhance a precision of the ellipsoid parameter.

9. The precision calibration method of attitude measuring system of claim 8 wherein, before the step of updating the ellipsoid parameter by the electronic compass using the measured data during the measuring process so as to enhance the precision of the ellipsoid parameter is conducted, the following step is conducted:

removing a hopped calculation point from the collected electronic compass data by means of a statistical rule.

* * * * *